United States Patent
Rogren

(10) Patent No.: US 10,974,453 B2
(45) Date of Patent: *Apr. 13, 2021

(54) THREE-DIMENSIONAL, ADDITIVE MANUFACTURING SYSTEM, AND A METHOD OF MANUFACTURING A THREE-DIMENSIONAL OBJECT

(71) Applicant: KERACEL, INC., San Jose, CA (US)

(72) Inventor: Philip Eugene Rogren, Half Moon Bay, CA (US)

(73) Assignee: KERACEL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,265

(22) Filed: Oct. 7, 2019

(65) Prior Publication Data

US 2020/0108553 A1 Apr. 9, 2020

Related U.S. Application Data

(60) Provisional application No. 62/742,505, filed on Oct. 8, 2018.

(51) Int. Cl.
*B29C 64/20* (2017.01)
*B29C 64/165* (2017.01)
(Continued)

(52) U.S. Cl.
CPC ............ *B29C 64/20* (2017.08); *B29C 64/147* (2017.08); *B29C 64/165* (2017.08);
(Continued)

(58) Field of Classification Search
CPC ......... B29C 64/20; B33Y 10/00; B33Y 30/00; B33Y 50/00
See application file for complete search history.

(56) References Cited

U.S. PATENT DOCUMENTS

| 6,076,652 A | 6/2000 | Head, III |
| 2004/0081475 A1 | 4/2004 | Phillips et al. |

(Continued)

FOREIGN PATENT DOCUMENTS

| KR | 10-2017-0003935 A | 1/2017 |
| WO | 2017/156623 A1 | 9/2017 |

(Continued)

OTHER PUBLICATIONS

International Search Report and Written Opinion for PCT/US2019/031171 dated Jul. 17, 2019.

(Continued)

*Primary Examiner* — Joseph S Del Sole
*Assistant Examiner* — Yung-Sheng M Tsui
(74) *Attorney, Agent, or Firm* — NovoTechIP International PLLC

(57) ABSTRACT

A three-dimensional, additive manufacturing system is disclosed. The first and second printer modules form sequences of first patterned single-layer objects and second patterned single-layer objects on the first and second carrier substrates, respectively. The patterned single-layer objects are assembled into a three-dimensional object on the assembly plate of the assembly station. A controller controls the sequences and patterns of the patterned single-layer objects formed at the printer modules, and a sequence of assembly of the first patterned single-layer objects and the second patterned single-layer objects into the three-dimensional object on the assembly plate. The first transfer module transfers the first patterned single-layer objects from the first carrier substrate to the assembly apparatus in a first transfer zone and the second transfer module transfers the second patterned single-layer objects from the second carrier substrate to the assembly apparatus in a second transfer zone. The first and second printer modules are configured to (Continued)

deposit first and second materials under first and second deposition conditions, respectively. The first and second materials are different and/or the first and second deposition conditions are different.

24 Claims, 13 Drawing Sheets

(51) Int. Cl.
    *B29C 64/147* (2017.01)
    *B29C 64/393* (2017.01)
    *B33Y 80/00* (2015.01)
    *B33Y 10/00* (2015.01)
    *B33Y 30/00* (2015.01)
    *B33Y 50/02* (2015.01)
    *B29C 64/379* (2017.01)

(52) U.S. Cl.
    CPC .......... *B29C 64/379* (2017.08); *B29C 64/393* (2017.08); *B33Y 10/00* (2014.12); *B33Y 30/00* (2014.12); *B33Y 50/02* (2014.12); *B33Y 80/00* (2014.12)

(56) References Cited

U.S. PATENT DOCUMENTS

| | | | |
|---|---|---|---|
| 2008/0179771 A1* | 7/2008 | Miao | C04B 38/0006 264/44 |
| 2008/0192093 A1 | 8/2008 | Pinard et al. | |
| 2009/0226833 A1 | 9/2009 | Sato et al. | |
| 2010/0038807 A1 | 2/2010 | Brodkin et al. | |
| 2013/0075013 A1 | 3/2013 | Chillscyzn et al. | |
| 2013/0075022 A1 | 3/2013 | Chillscyzn et al. | |
| 2013/0077996 A1 | 3/2013 | Hanson et al. | |
| 2013/0272746 A1 | 10/2013 | Hanson et al. | |
| 2015/0227070 A1 | 8/2015 | Martin | |
| 2016/0067922 A1 | 3/2016 | Voris et al. | |
| 2016/0200084 A1* | 7/2016 | Hays | B29C 64/236 156/62.2 |
| 2017/0050379 A1 | 2/2017 | Houben et al. | |
| 2017/0299973 A1 | 10/2017 | Frauens | |
| 2018/0034038 A1 | 2/2018 | Rogren | |
| 2018/0043619 A1 | 2/2018 | Kim et al. | |
| 2018/0085993 A1 | 3/2018 | Biskop et al. | |
| 2019/0375159 A1* | 12/2019 | Rogren | B29C 64/209 |
| 2020/0171752 A1 | 6/2020 | Rogren | |

FOREIGN PATENT DOCUMENTS

| | | |
|---|---|---|
| WO | 2019/152797 A1 | 8/2019 |
| WO | 2019/236236 A1 | 12/2019 |
| WO | 2020/076734 A1 | 4/2020 |
| WO | 2020/117498 A1 | 6/2020 |

OTHER PUBLICATIONS

International Search Report and Written Opinion for PCT/US2019/055061 dated Jan. 2, 2020, 12 pages.

International Search Report and Written Opinion for PCT/US2019/062839 dated Feb. 7, 2020, 14 pages.

\* cited by examiner

THREE-DIMENSIONAL, ADDITIVE MANUFACTURING SYSTEM, AND A METHOD OF MANUFACTURING A THREE-DIMENSIONAL OBJECT

PRIORITY

This application claims the benefit of U.S. Provisional Application Ser. No. 62/742,505, entitled "MULTI-METHOD three-dimensional PRINTER," filed Oct. 8, 2018, which is incorporated by reference herein.

FIELD

The present disclosure relates to systems and apparatuses for three-dimensional printing.

BACKGROUND

Three-dimensional, additive manufacturing (3D printing) has generated a high degree of interest in the potential for a faster and more economical manufacturing approach since it was first conceived over 30 years ago. To date, however, that potential has largely gone unfulfilled. Today, the vast majority of 3D printers are used to make demonstration parts or nonfunctional prototypes, mostly from a plastic material that is chosen primarily for compatibility with the printer rather than the materials requirement of the final part.

Among the issues preventing wider acceptance of 3D printing as a commercially viable manufacturing method is the requirement of specific applications for specific materials compatible with these applications. Another issue is the need for enhanced precision in some sections of a part compared to the remaining bulk of the part. With current technology, the need for enhanced precision forces the choice of a 3D printing technology capable of providing the required precision, which typically results in slower build rates than less precise methods. These slower build rates can have a significant cost impact on the final part if applied to the total volume of the part.

While 3D printing holds the potential to produce three-dimensional objects with more efficient use of materials and lower resultant weight of the finished object, most conventional 3D printing techniques deposit or fix in place, a single voxel at a time. The most common 3D printers, of the fused deposition modeling (FDM) type, extrude a line of melted polymer. In addition to being severely limited by the available materials set, FDM is also very slow. Directed energy printers produce a phase change in a layer of material. The phase change may be brought about by sintering or melting by computer guided application of a laser or electron beam, or polymerization by directed exposure to selected electromagnetic radiation. Directed energy printers, as a class, significantly expand the available materials set and owing to the fact that they operate on a rapidly positioned layer of material, have the potential to be faster than FDM printers. Of the current 3D printer technologies, the printers with the greatest flexibility in materials selection and the fastest speed are those employing jetted binder technology. These printers rapidly deposit a full layer of powder and then fix a pattern in the powder by depositing a binding agent via an ink jet-type printing head. The result is a system that builds objects from a wide verity of materials at rates that are at least an order of magnitude greater than FDM printers.

Overall, jetted binder printers are the best among current technology but can incorporate only a single material in an object. While they are capable of patterning large amounts of materials per unit time, the minimum practical layer thickness achievable with such systems is typically around 25 µm. This limitation also limits the precision of the printed layer.

Printing techniques such as electrophotography are capable of printing large areas with very high precision very rapidly but are limited to printing very thin layers. The relatively low mass deposition rate of electrophotography and added complexity of electrophotographic systems render them unattractive for a 3D printing system if all voxels in an object are formed electrophotographically.

SUMMARY

Embodiments of the invention are directed to a three-dimensional, additive manufacturing system described herein as a multi-material, multi-method printer system. The printer system comprises a system of printer modules. All the modules are directed by a central computer system (sometimes referred to as a controller) to coordinate the modules as necessary to deposit the proper material at the required precision to a single build location, while maximizing the overall build rate. Because high build rate is essential for economic operation, the preferred basic technology for each module is jetted binder. Where jetted binder technology does not provide the required properties for specific voxels, printer modules may be based on more suitable techniques. For example, directed energy beam printers or electrophotographic printers may be used.

In one embodiment, printer modules incorporating jetted binder technology are combined with printer modules based on other technologies. The multi-materials 3D printer described in U.S. provisional patent application 62/682,067, entitled "Multi-Materials 3D Printer" filed Jun. 7, 2018, and U.S. patent application Ser. No. 16/167,088, entitled "Multi-Material Three Dimensional Printer" filed Oct. 22, 2018, the entireties of which are hereby incorporated by reference, represents one of the jetted binder technologies that may be incorporated into a printer module of the multi-material multi-method 3D printer of the present invention.

The solution to the problems described above is the ability to employ printing techniques that are optimized for the materials needed for the application and for the precision needed for specific voxels within the part. Embodiments of the invention provide a solution by providing a 3D printing system comprising a plurality of materials printer modules, each of these modules chosen for its ability to deposit a specific material or group of materials at the precision required for specific voxels of the target application.

In accordance with one aspect of the invention, a jetted binder printing system is disclosed that includes a carrier substrate on which multiple patterned single-layer objects are formed, the patterned single-layer objects being separated from each other on the carrier substrate, the carrier substrate being displaced along a direction of travel; a dispensing module to dispense fluidized particles onto the carrier substrate to form a material layer; a compaction module positioned downstream from the dispensing module along the direction of travel, to increase the compaction of the material layer to a predetermined compaction range; a binder printer positioned downstream from the compaction module along the direction of travel, to print a binder material on the material layer according to a predetermined pattern; a fusion module positioned downstream from the binder printer along the direction of travel, to cause selective fusion of the material layer according to the predetermined pattern; a material removal module positioned downstream from the fusion module along the direction of travel, to remove non-fused portions of the material layer to form one of the patterned single-layer objects; a transfer module positioned downstream from the material removal module along the direction of travel, to transfer the one of the patterned single-layer objects from the carrier substrate to an assembly plate; an assembly station comprising the assembly plate, the patterned single-layer objects being assembled into a stack on the assembly plate according to a predetermined sequence of objects including the patterned single-layer objects; and a controller to control the predetermined sequence and predetermined patterns.

In the jetted binder printing system of the preceding paragraph, the carrier substrate may be a belt.

In the jetted binder printing system of the preceding paragraphs, the carrier substrate may additionally comprise an adhesion control layer on which the material layer is formed.

In the jetted binder printing system of the preceding paragraphs, the dispensing module may comprise a dispensing controller configured to precisely meter an amount of fluidized particles dispensed onto the carrier substrate In the jetted binder printing system of the preceding paragraphs, the dispensing module may comprise a roller to spread the fluidized particles on the carrier substrate.

In the jetted binder printing system of the preceding paragraphs, the compactor module may comprise a compliant pressure cuff or a pressure plate assembly.

In the jetted binder printing system of the preceding paragraphs, the compactor module may comprise a vibratory energy source to cause settling of the fluidized particles.

In the jetted binder printing system of the preceding paragraphs, the binder printer may comprise an ink jet print head.

In the jetted binder printing system of the preceding paragraphs, the fusion module may comprise an energy source selected from the following: ultraviolet (UV) source, infrared (IR) source, electron beam source, and a heat source.

In the jetted binder printing system of the preceding paragraphs, the fusion module may comprise a reactive agent dispenser to dispense a reactive agent that reacts with the binder material and the fluidized particles to immobilize the fluidized particles.

In the jetted binder printing system of the preceding paragraphs, the material removal module may comprise a mechanical disrupter.

In the jetted binder printing system of the preceding paragraphs, the material removal module may comprise an air knife.

In the jetted binder printing system of the preceding paragraphs, the material removal module may comprise a vacuum port.

In the jetted binder printing system of the preceding paragraphs, the assembly station may additionally comprise a lateral positioner to laterally displace the assembly plate.

In the jetted binder printing system of the preceding paragraphs, the assembly station may additionally comprise a vertical positioner to vertically displace the assembly plate.

In the jetted binder printing system of the preceding paragraphs, the carrier substrate may comprise a fiducial marker for each of the patterned single-layer objects; and the assembly station may comprise an alignment sensor to align the fiducial markers to the assembly plate.

In the jetted binder printing system of the preceding paragraphs, the controller may additionally control the predetermined compaction range of each material layer.

In the jetted binder printing system of the preceding paragraphs, the transfer module may comprise a pressure roller or a pressure plate.

In accordance with another aspect of the invention, a method of manufacturing a three-dimensional object is disclosed that includes repeatedly forming patterned single-layer objects according to a predetermined sequence and predetermined patterns; and assembling the sequence of the patterned single-layer objects into the three-dimensional object on an assembly plate; wherein the step of forming each of the patterned single-layer objects comprises: dispensing fluidized particles onto a carrier substrate to form a material layer; compacting the material layer to a predetermined compaction range; printing a binder material on the material layer according to a predetermined pattern; selectively fusing the material layer according to the predetermined pattern; removing non-fused portions of the material layer to form one of the patterned single-layer objects; and transferring the one of the patterned single-layer objects from the carrier substrate to the assembly plate.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION

Figure 1:
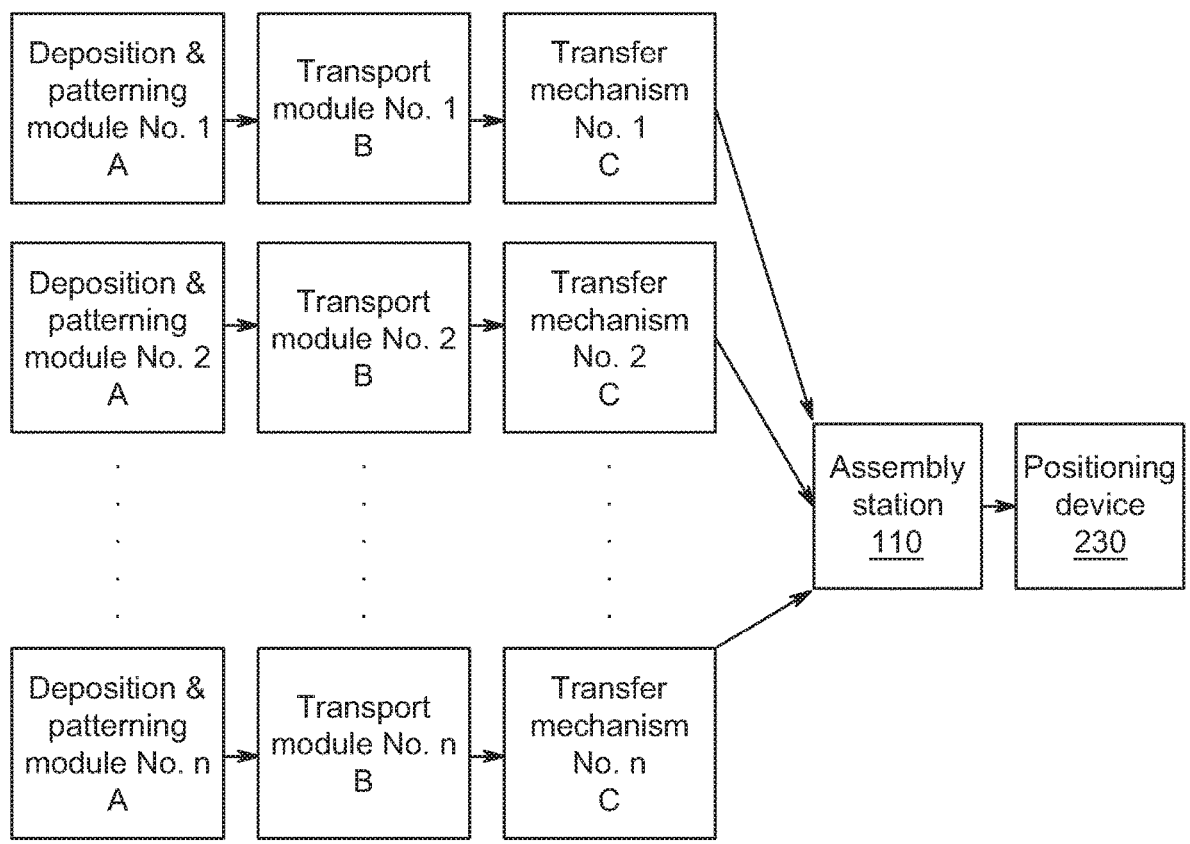
FIG. 1 is a block diagram of some of the major components of a three-dimensional, additive manufacturing system in accordance with one embodiment of the invention.

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

A three-dimensional, additive manufacturing system is disclosed. The first and second printer modules form sequences of first patterned single-layer objects and second patterned single-layer objects on the first and second carrier substrates, respectively. The patterned single-layer objects are assembled into a three-dimensional object on the assembly plate of the assembly station. A controller controls the sequences and patterns of the patterned single-layer objects formed at the printer modules, and a sequence of assembly of the first patterned single-layer objects and the second patterned single-layer objects into the three-dimensional object on the assembly plate. The first transfer module transfers the first patterned single-layer objects from the first carrier substrate to the assembly station in a first transfer zone and the second transfer module transfers the second patterned single-layer objects from the second carrier substrate to the assembly station in a second transfer zone. The first and second printer modules are configured to deposit first and second materials under first and second deposition conditions, respectively. The first and second materials are different and/or the first and second deposition conditions are different.

Definitions

To improve ease of understanding throughout this disclosure, certain definitions are provided below:

Printer module—A patterning and deposition system configured to create a printed object (also referred to as a single-layer object) on a carrier substrate.

Transfer module—A transport system configured to receive a printed object from a printer module and of transfer that printed object into a printed layer of a printed part.

Assembly apparatus—A system configured to receive printed objects from a plurality of transfer modules and assemble the received printed objects according to a predetermined sequence (instructed by a controller) in such a way as to form printed parts according to a predetermined design.

Printed part—A stack of printed layers, fused together to form a part (a three-dimensional object) conforming to a predetermined design.

Printed Layer—A material layer, one voxel thick, that consists of one or more printed objects. These printed objects, and hence the printed layer, conform to the requirements of a specific printed part design. For example, a printed layer might consist of two printed objects, the first of which is made at a first printer module and the second of which is made at a second printer module.

Printed object—A material layer, one voxel thick, formed at a printer module. Also referred to as a single-layer object. When assembled and fused into a printed part (a three-dimensional object) according to a predetermined sequence, the resulting three-dimensional object conforms to the requirements of a specific printed part design. The pattern of the printed object (single-layer object) conforms to a pattern at a predetermined location in the printed part.

Previously transferred objects—The entire assembly of printed objects that have been assembled at the assembly apparatus before the printed object (single-layer object) being currently transferred. It is possible that the printed object being currently transferred will be added to the topmost layer, in which case the topmost layer would not yet have all of the printed objects required according to the printed part design.

A Plurality of Printer Modules

The multi-material, multi-method 3D printer system of the present invention comprises an arrangement of a plurality of printer modules. Each printer module comprises a mechanism for creating a precise and robust printed object (single-layer object). Each printed object may comprise a predetermined material and conform to a predetermined set of physical requirements. Each one of the plurality of printer modules may be coupled to and communicate with one of a plurality of transport modules. Each one of the plurality of transport modules may comprise a carrier substrate upon which an associated printer module may form a 3D printed object. Each transport module may additionally comprise a transfer mechanism to transfer a printed object to an assembly apparatus. The assembly apparatus may comprise a build station and may additionally comprise a positioning apparatus. The build station is sometimes referred to as an assembly apparatus.

Printed Objects Stacked to Form a Printed Part

FIG. 1 illustrates a three-dimensional additive manufacturing system 100, in accordance with embodiments of the present disclosure. The components illustrated in FIG. 1 function in coordination with the rest of the components as directed by a computer system 10 (controller), illustrated in FIG. 2. The computer system 10 is directed by a design file 310 program which may contain all the information necessary to for the central processing unit 320 to cause the plurality of components of the 3D multi-material, multi-method printer system 100 to create the predetermined multi-material printed part (three-dimensional object) to be constructed.

As shown in FIG. 1, the three-dimensional additive manufacturing system 100 can includes multiple deposition and patterning (print) modules A, multiple transfer modules B and multiple transfer mechanisms C. Each of the transfer mechanisms C is connected to an assembly station 110, which is connected to a positioning module 230. The print modules A of the multi-material, multi-method printer system may be chosen for their capability to create printed objects of required physical characteristics in a predetermined material. In one embodiment, at least half of the printer modules incorporated in the printer system may be based on jetted binder technology.

A plurality of printed objects, each from the ones of a plurality of printer modules may be transferred to the assembly station 110 to form a printed layer. A plurality of printed layers may be sequentially stacked one upon the other to form one or a plurality of multi-material printed parts (three-dimensional object).

The positioning module 230 may be used to position the assembly (or build) station 110 relative to any designated one of the plurality of the transfer mechanisms C. Combined, the build station 110 and positioning apparatus 230 comprise an assembly apparatus.

Computer System

Figure 2:
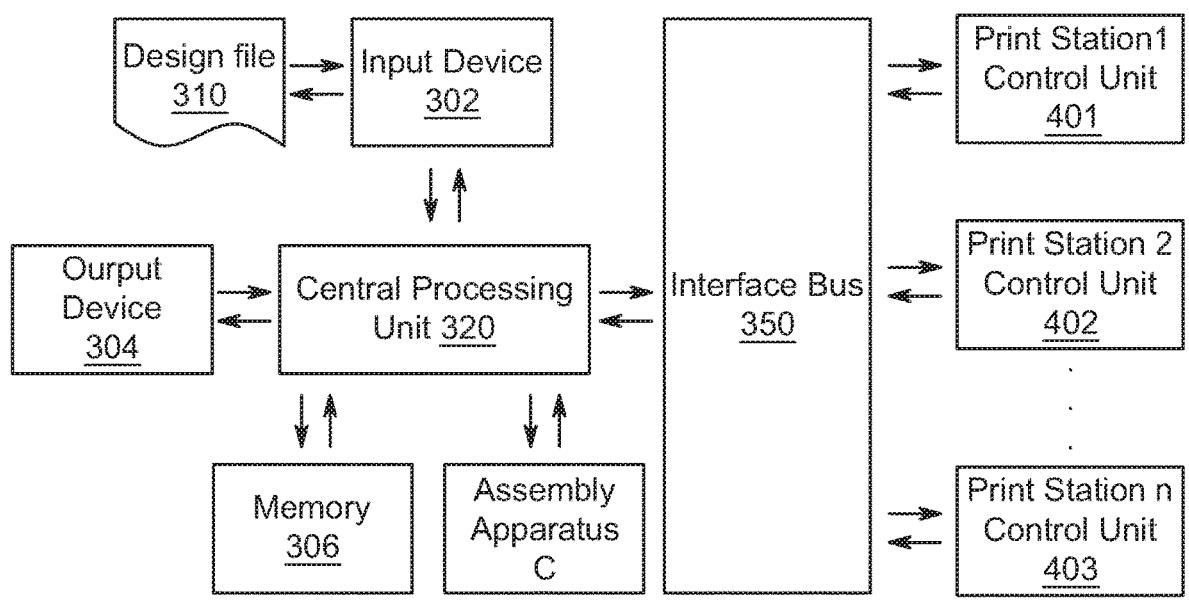
FIG. 2 is a schematic diagram of the relationships and communication paths among some of the components of a three-dimensional, additive manufacturing system in accordance with one embodiment of the invention.

FIG. 2 illustrates an exemplary computer system for controlling the manufacturing system 100. Each print module or station A comprises an associated print station controller 401, 402, 403. As shown in FIG. 2, the print station controllers 401, 402, 402 are directed by a central processing unit 320 through an interface bus 350. Central processing unit 320 may also coordinate the actions of assembly apparatus C. Computer system 10 also comprises an input device 302 for loading design file 310 and other operating instructions, memory 306 for storing the design file for direct access by central processing unit 320 and output device 304.

Figure 3:
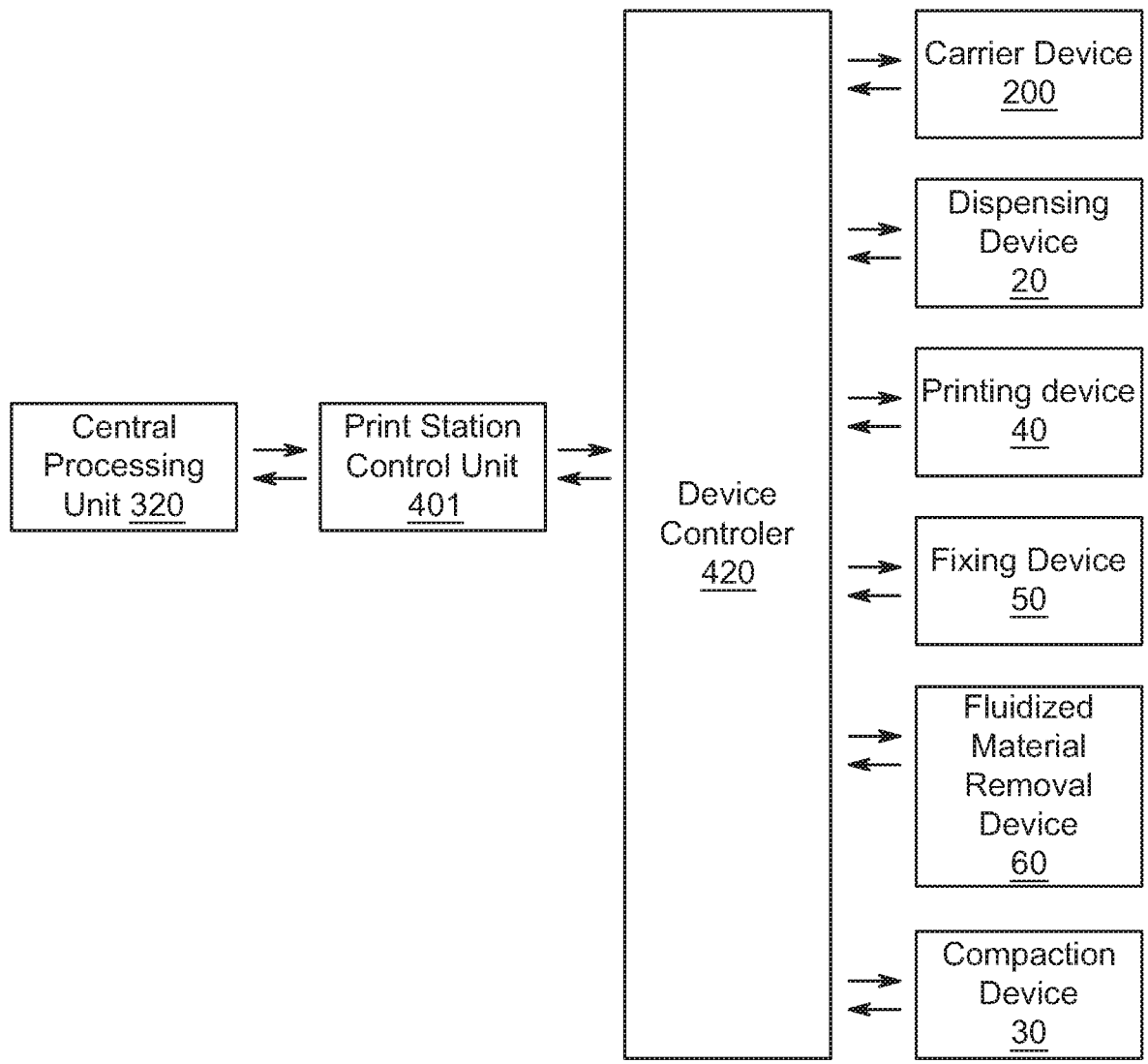
FIG. 3 is a schematic diagram of the relationships and communications paths among components of a jetted binder printer module in accordance with one embodiment of the invention.

FIG. 3 illustrates an individual jetted printer station controller. As shown in FIG. 3, the central processing unit 320 is connected to the components of the jetted binder printer module. Print station control unit 401 represents one of the plurality of print station control units and directs the actions of a carrier device 200, a dispensing device 20, a compaction device 30, a printing device 40, a fixing device 50, and a fluidized material removal device 60 of the jetted binder printer module through a device controller 420.

Figure 4:
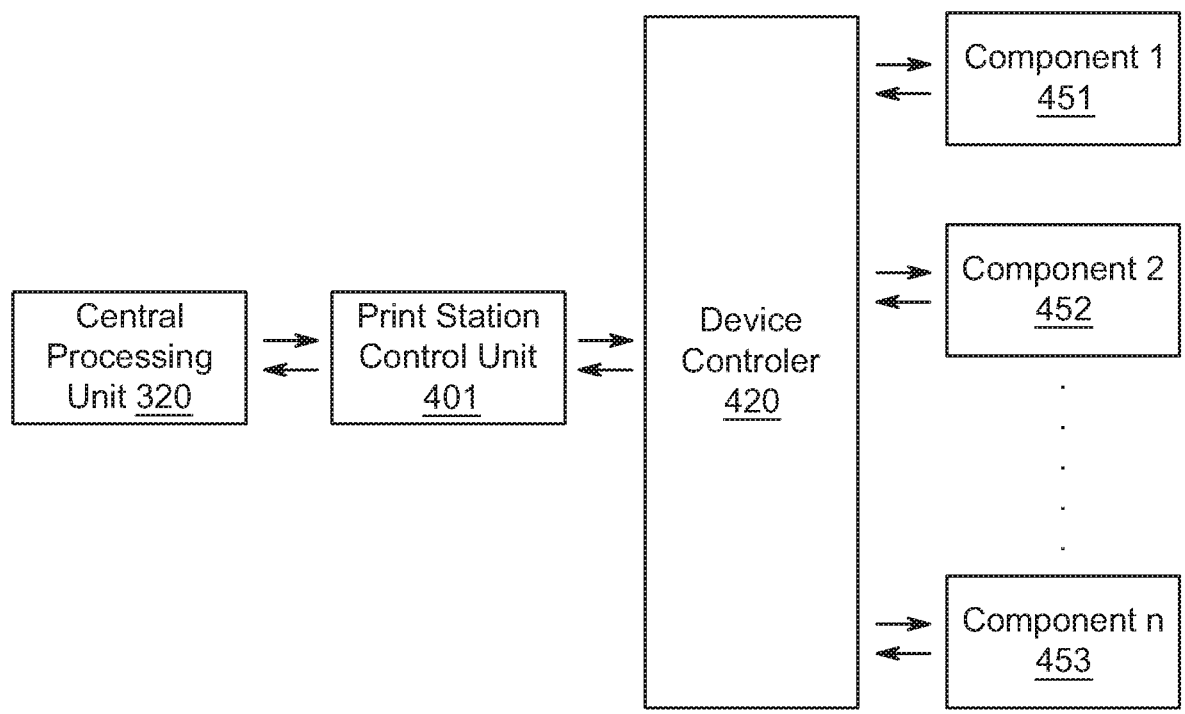
FIG. 4 is a schematic diagram of the relationships and communications paths among components of a generic printer module in accordance with one embodiment of the invention.

FIG. 4 represents a control configuration of a 3D printer module other than a jetted binder printer module. Regardless of the basic printing technology, the interface between the central processing unit 320 and a print station control unit 401 may be identical. The interface between a print station control unit and the component 1 451, component 2 452 and component n 453 of the printer module may be customized to optimize performance based on the requirements of the print module performance. In some embodiments, a device controller 420 may be intermediate between a print station control unit 401 and the individual components 451, 452, 453. In another embodiment, the print station control unit 401 may communicate directly with the individual components 451, 452, 453.

In one embodiment, each of the printer modules may be controlled by dedicated controller and each printer control module may be coordinated by a central processing unit to create printed objects in a sequence appropriate for assembling printed layers and printed parts.

3D Printer System

Figure 5:
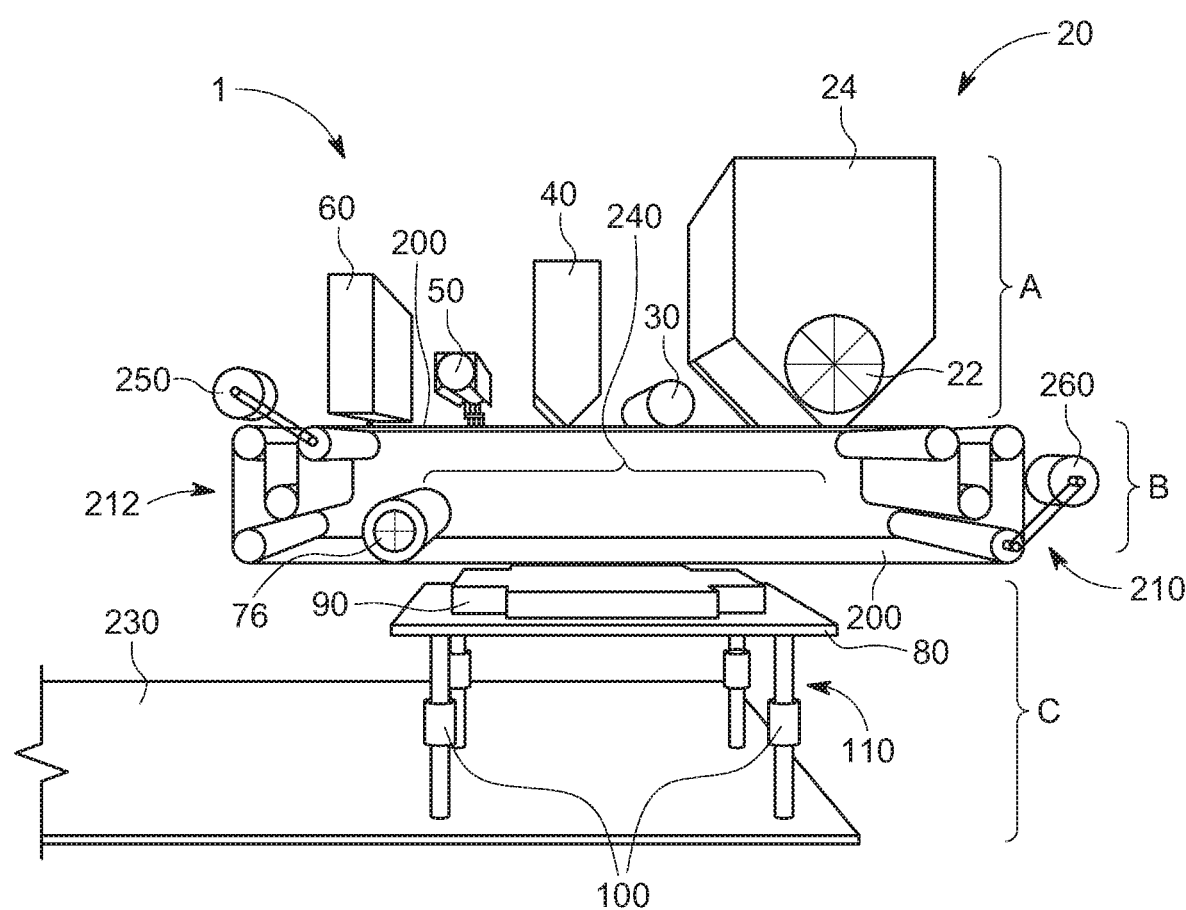
FIG. 5 is a schematic diagram illustrating some components of a three-dimensional, additive manufacturing system including a jetted binder printer module in accordance with one embodiment of the invention.

FIG. 5 illustrates some of the basic components of a 3D printer system. For simplicity only one of a plurality of printer modules A and transfer modules B are represented in FIG. 5. FIG. 5 further illustrates a possible relationship between printer module A, transfer module B and assembly apparatus C.

Jetted Binder Printer Module

Printer module A of FIG. 5 is represented as a jetted binder printer module 1 and comprises components to create a printed object from a single powdered material, conforming to a predetermined physical specification. A jetted binder printer module 1 may create a printed object on a carrier substrate 200 of transfer module B.

Transfer Module

In addition to carrier substrate 200, transfer module B may comprise one or more buffer devices 212 & 210 and a transfer device 76. Carrier substrate 200 may comprise an endless loop (endless belt) of mechanically stable material such as, but not limited to, a steel alloy, a copper alloy or a polymeric material. Carrier substrate 200 may also comprise a mechanically stable material coated with a material to control adhesion of printed objects to the carrier substrate 200. The adhesion control material coated on carrier substrate 200 may be chosen to control the adhesion of printed material within a predetermined range for the 3D printed material of the current printed object. The adhesion control material may comprise for example, a silicone material, a fluoropolymer material, or a thin film metal such as gold.

Figure 5A:
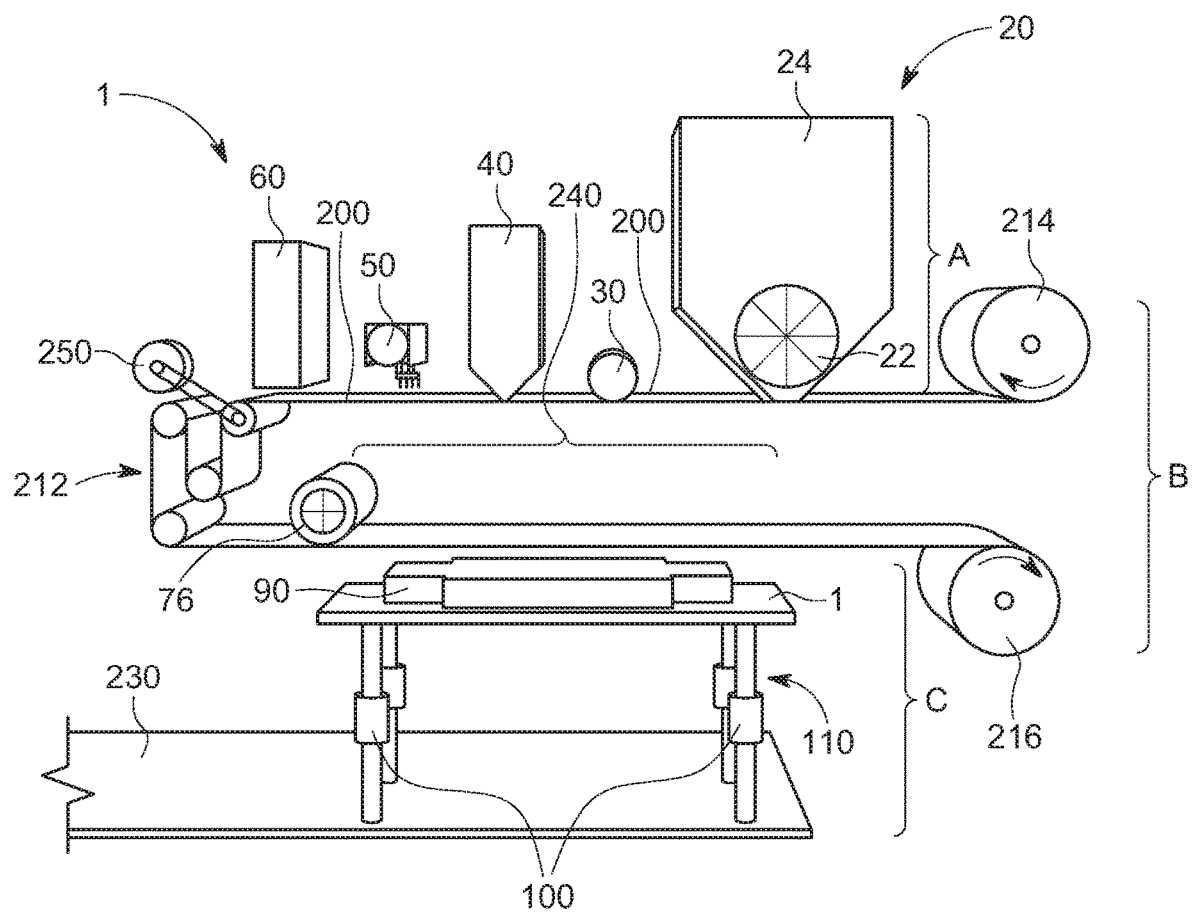
FIG. 5a is a schematic diagram illustrating some components of a three-dimensional, additive manufacturing system including a jetted binder printer module in accordance with one embodiment of the invention.

In an alternative embodiment, as shown in FIG. 5*a*, carrier substrate 200 may comprise a length of mechanically stable material played into transfer module B from source reel 214. Source reel 214 may be provided at a distal end of transfer module A. After a printed object is transferred off carrier substrate 200 in transfer area 240, the used length of carrier 200 may be accumulated on take-up reel 216. Carrier substrate 200 of FIG. 5*a* may comprise a mechanically stable material coated with a material to control adhesion of printed objects to the carrier substrate 200. The adhesion control material coated on carrier substrate 200 may be chosen to control the adhesion of printed material within a predetermined range for the 3D printed material of the current printed object. The adhesion control material may comprise for example, a silicone material, a fluoropolymer material, or a thin film metal such as gold. In any case, the carrier substrate is displaced along a direction of travel while the printer system is operating.

In accordance with an embodiment of the present invention, jetted binder printer module 1 may be in communication with carrier substrate 200 of transfer module B in order to create a 3D printed object on carrier substrate 200.

At a distal end of transfer module B, a dispensing device 20 can be provided. Dispensing device is sometimes referred to as a dispensing module. The dispensing device 20 can simply be a dispenser configured to dispense fluidized material. The dispensing device 20 can include a materials storage 21 and a dispensing controller 22. The dispensing controller 22 can be configured to precisely meter an amount of fluidized material onto a carrier substrate 200. The dispensing controller 22 can also be configured to precisely control the uniformity of the deposited fluidized material. The dispensing module can include a roller to spread the fluidized particles on the carrier substrate.

Near the distal end of the transfer module B, a compaction device 30 can be provided. Compaction device is sometimes referred to as a compaction module. The compaction module is positioned downstream from the dispensing module along the direction of travel. In some embodiments, the compaction device 30 can include a roller, made up of a hardened metal material designed as a cylindrical tube. In other embodiments, the compaction device 30 can include a compliant pressure cuff, or another device configured to apply a controlled pressure orthogonal to the plane of the deposited fluidized material and the carrier substrate 200. The compaction device 30 can also include a settling device configured to provide vibration. The vibration of the compaction device 30 can improve the distribution and compaction of the fluidized material. In some embodiments, the compaction device 30 can be configured to compact a fluidized material to a high density of at least 40% of the theoretical density of the fluidized material.

Printing Device

Near the distal end of the carrier substrate 200, a printing device 40 (also referred to as a binder printer) can be provided. The binder printer is positioned downstream from the compaction module along the direction of travel. The printing device 40 can be configured to deposit a liquid binding material to fix a predetermined pattern into a fluidized material. The precise pattern can be fixed into the fluidized material by binding the fluidized material into a connected and robust mass. In some embodiments, the printing device 40 can be an ink jet type print head under direct control of a computer system of FIG. 2 and FIG. 3. The computer system can be instructed using a set of patterning instructions, for instance a predetermined CAD (computer aided design) program.

The printing device 40 can include an ink jet type print head with jetting nozzles spanning the width of the carrier substrate 200. The ink jet type print heads can also be provisioned at a sufficient density to achieve a desired print resolution. The ink jet type head can be fixed in position and the functioning of each jetting nozzle can be coordinated with the movement of the carrier substrate 200 to create the desired pattern in the fluidized material. Movement of carrier substrate 200 relative to printing device 40 may be implemented by proximal buffer 212 and printing device motor 250 as controlled computer system 10. Additional buffers may be positioned between proximal buffer 212 and distal buffer 210, to more precisely control the interaction between the developing 3D printed object and any of the components of jetted binder printer module 1.

In alternative embodiments, the printing device 40 can include an ink jet head that includes fewer jetting nozzles than are required to span the width of carrier substrate 200, and yet achieve a printed object the full width of carrier substrate 200 and a desired resolution. The ink jet type head can be movable, under computer control, across the width of the carrier substrate 200, and the movement of both the ink jet type print head and proximal buffer 212 and printing drive motor 250 may be coordinated to achieve the desired fixed printed pattern in the fluidized material.

The printing device 40 may comprise one or more commercially available print heads. For example, Fujifilm supplies an array of print heads with a wide range of properties to accommodate the range of requirements anticipated. In a preferred embodiment, printing device 40 may deliver a measured and adjustable volume of binder to a target voxel of the printed object 91 with every pulse of the print head. Printing device 40 may deliver one or more measured volume to each voxel under control of the computer system. In a preferred embodiment, the print head 40 may be capable of 600 dpi resolution and each jet may deposit up to 200 picolitre (pl) during each pulse.

Fixing Device

Near the center of the carrier substrate 200, a fixing device (or fusion module) 50 can be provided. The fusion module or fixing device 50 is positioned downstream from the binder printer along the direction of travel. The fixing device 50 can be configured to solidify the liquid binding material, thus fixing the fluidized material exposed to the liquid binding material in a robust solid pattern. The fixing device 50 can be a source of radiant energy that may interact with the liquid binding material to cause it to become solid. In some embodiments, the radiant energy can be IR radiation, UV radiation, electron beam, or other known radiation types. Alternatively, the fusion module 50 can include a heat source. It should be understood the fixing device 50 does not need to be limited to the disclosed radiation types, as this list is presented for exemplary embodiments and not intended to be exhaustive. Alternatively, the fixing device 50 can include a device for dispersing a reactive agent. The reactive agent can be configured to react with the liquid binding material and the fluidized material to convert the fluidized material to a robust mass.

Fluidized Material Removal Device

A fluidized materials removal device 60 can be provided downstream, relative to movement of carrier substrate 200, from the fixing device 50. The fluidized material removal device 60 is sometimes referred to as a material removal module. The material removal module is positioned downstream from the fusion module along the direction of travel. The fluidized materials removal device 60 can be configured to remove all of the fluidized material deposited and compacted onto the carrier substrate 200. The fluidized materials removal device 60 can remove the fluidized material deposited and compacted onto the carrier substrate, but not fixed in place by the liquid binder material.

Figure 6:
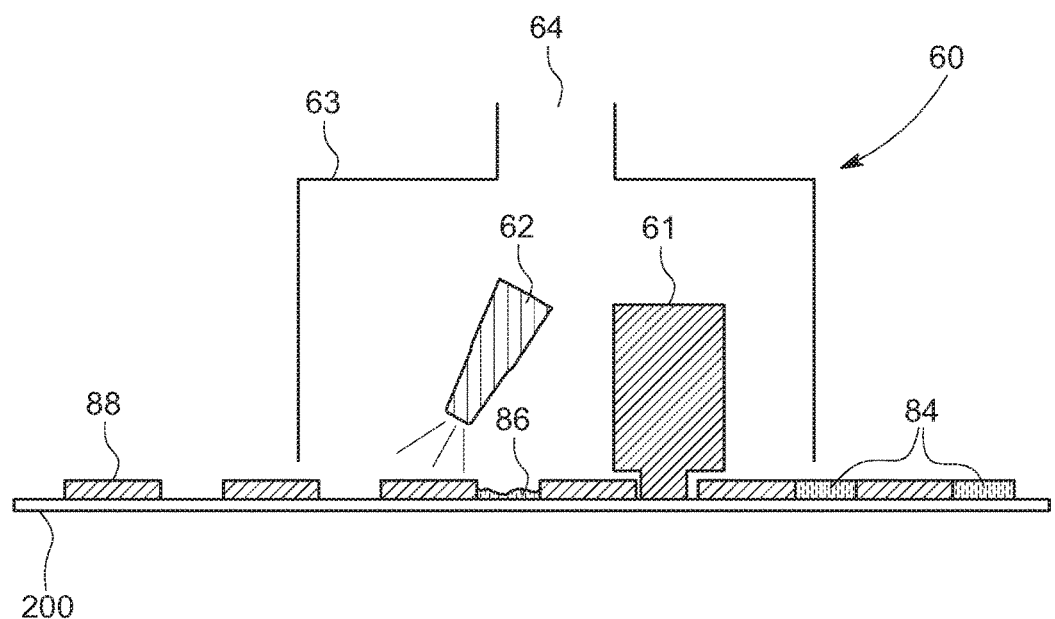
FIG. 6 is a schematic diagram illustrating a fluidized material removal module in accordance with one embodiment of the invention.

The fluidized material removal device 60 is illustrated in detail in FIG. 6. As shown in FIG. 6, the fluidized material removal device 60 includes an enclosure 63 which can have a distal end and a proximal end. Carrier substrate 200, with fixed fluidized material 88 of a printed object 91 and compacted fluidized material 85 may be transported from a distal end to a proximal end of enclosure 63. Enclosure 63 may contain a disruptive device 61 (mechanical disrupter), such as a brush or a probe, to loosen compacted powder 84. Disruptive device 61 may be designed to have disruptive strength sufficient to disrupt compacted powder that has not been fixed in place by binder from printing device 40, but to not have disruptive strength sufficient to disrupt compacted powder which has been treated with binder from printing device 40 and fixed by fixing device 50 of FIG. 5. Once loosened from attachment to powder fixed in place by binder from printing device 40 of FIG. 5, residual powder 86 may be further dislocated and aerosolized by an air knife device 62. When the non-fixed compacted powder 84 is fully dislodged and aerosolized within enclosure 63, fixed powder 88 may remain attached to carrier substrate 200. The aerosolized compacted powder 84 may be removed from enclosure 63 by a vacuum force attached to vacuum port 64.

Transfer Module

As discussed above, each multi-method printer system may be provided with a plurality of transfer modules B. In one embodiment, one transfer module B may be provided in communication with each one of a plurality of printer modules A associated with the printer system. Transfer module B is positioned downstream from the material removal module along the direction of travel. A transfer module B may provide a substrate for the creation of a printed object and to cause the transfer of a printed object from that substrate (carrier substrate 200) to assembly apparatus C. As shown in FIG. 5, the transfer module B comprises a substrate 200, one or more buffers 210 and/or 212, one or more substrate drives 250, 260, and a transfer area 240. In some embodiments, the proximal buffer 212 may be provided between fluidized material removal device 60 and transfer area 240 (also referred to as transfer zone) in order to coordinate the residence time of a 3D printed object relative to transfer area 240 with the components of jetted binder print module 1.

Substrate 200 may comprise a length of flexible material that may be scaled such that its width is equal to or wider than build plate 80. The material of carrier substrate 200 may be, but is not limited to a steel alloy or a polymeric material such as polyester or polytetrafluoroethylene, or a composite material. The surface of carrier substrate 200 may be chosen to control the adhesion between substrate 200 and the materials to be printed by the associated printer module. In one embodiment, substrate 200 may comprise a loop of material that may traverse transfer module B from a distal buffer device 210 through a proximal buffer device 212 and back through a transfer device 76 to a distal buffer 212.

Transfer module B may comprise buffers in addition to distal buffer 210 and proximal buffer 212 in order to provide differential movement of carrier substrate 200 relative to components of printer module A and transfer device 76 to accommodate for different motion requirements between deposition, patterning, and transferring a printed object to build plate 80 or to the top of a stack of previously transferred objects 90.

Carrier substrate 200 may be moved by printing drive motor 250 and by transfer drive motor 260. Substrate 200 may also be provided with additional devices for controlling the movement of substrate 200 in compliance with the requirements of the individual steps of printed object formation and transfer to build station 110. Transfer device 76 can be implemented downstream, relative to the progressive movement of carrier substrate 200, from the fluidized materials removal device 60. Movement of a 3D printed object on carrier substrate 200 through transfer area 240 can be coordinated by distal buffer device 210 and transfer motor drive 260, which may be controlled by the computer system of FIG. 2 and FIG. 3.

Roller Transfer Device

Figure 7:
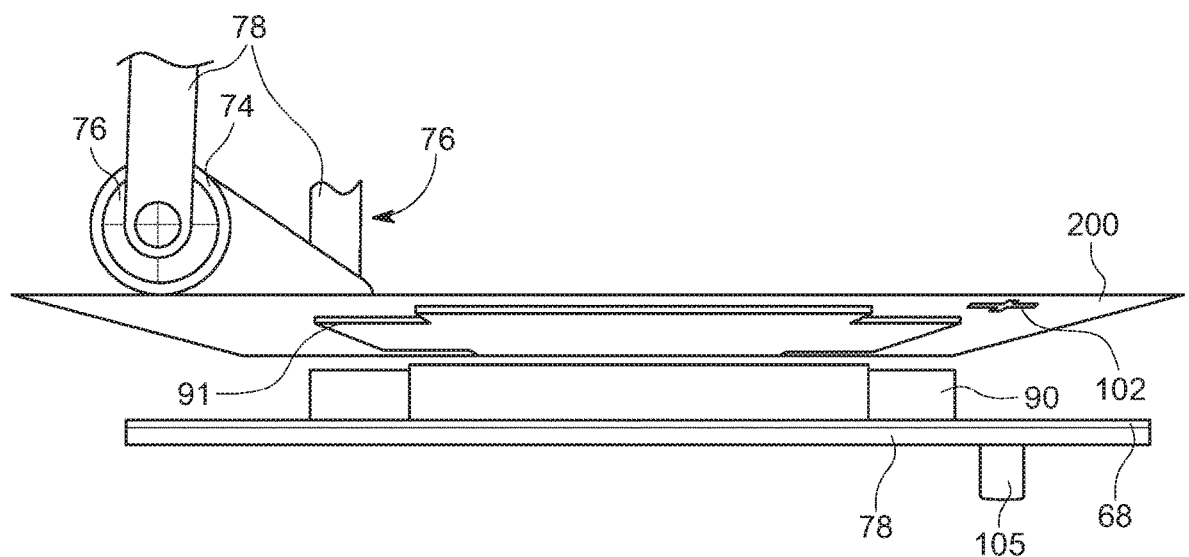
FIG. 7 is a schematic diagram illustrating a transfer module in accordance with one embodiment of the invention.

As shown in FIG. 7, the transfer device 76 may be configured to transfer a printed object 91 from carrier substrate 200 by causing contact and a pressure between printed object 91 and build plate 80 or the top of a stack of previously transferred printed objects 90. In an embodiment of transfer device 76, as shown in FIG. 7, the transfer device 76 includes a roller 79 and a carrier to support and move roller 79 vertically. In some embodiments, a carrier may be a two-axis carrier 77 to move roller 79 vertically and horizontally relative to carrier substrate 200. Vertical movement of two axis carrier 77 may deflect carrier substrate 200 and cause printed object 91 to make pressure contact with build plate 80 or the top of a stack of previously transferred printed objects 90. A horizontal movement of two-axis carrier 77 may then cause a progressively moving line contact moving in a predetermined direction from a one end printed object 91 to another end of printed object 91. The moving line contact across printed object 91 can transfer printed object 91 to build plate 80 or the top of a stack of previously transferred printed objects 90. Transfer device 76 may further comprise an adhesion modifier device 74.

Adhesion Modifier Device

An adhesion modifier device 74 may be provided that adjusts the adhesion strength of printed object 91 to carrier substrate 200 to facilitate the release of printed object 91 to build plate 80 or the top of a stack of previously transferred printed objects 90. Adhesion modifier device 74 may further modify the adhesion of printed object 91 to the surface of build plate 80 or the top of a stack of previously transferred printed objects such that the adhesive strength between a printed object 91 and carrier substrate 200 is less than the adhesive strength between a printed object 91 and build plate 80 or the top of a stack of previously transferred printed objects 90. Adhesion modifier device 74 may act upon the interface between carrier substrate 200 and printed object 91 by applying a stimulus to carrier substrate 200 or printed object 91 or both. The application of the stimulus can facilitate a reduction in adhesion of printed object 91 to carrier substrate 200. The stimulus causing an adjustment of adhesion from adhesion modifier 74 may be, but is not limited to a thermal stimulus, a radiation stimulus, a magnetic stimulus, a mechanical stimulus or a particle beam stimulus. Printed object 91 may also comprise an alignment fiducial 102.

Pressing Device

Figure 8:
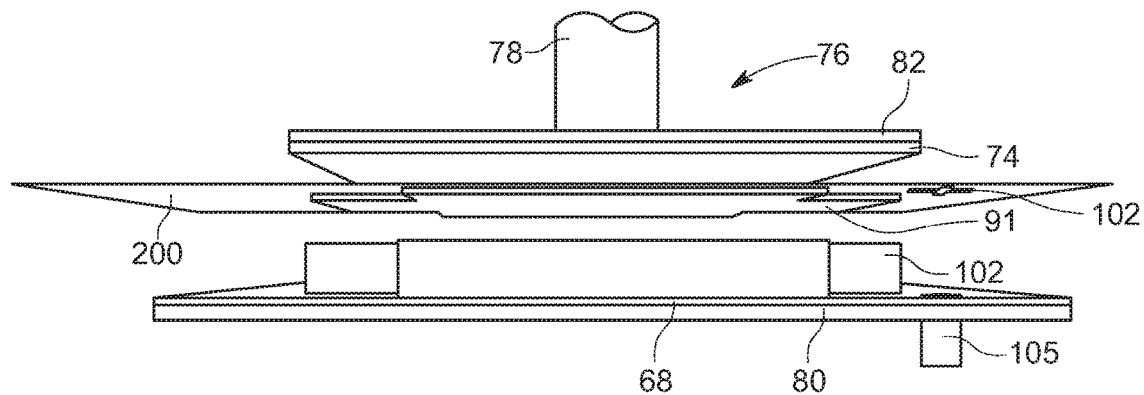
FIG. 8 is a schematic diagram illustrating a transfer module in accordance with one embodiment of the invention.

In another embodiment, as shown in FIG. 8, the transfer device 76 may comprise a pressing device 82. Pressing device 82 can be provided with single-axis carrier 78 to provide vertical movement of pressing device 82. The vertical movement of pressing device 82 may cause carrier substrate 200 to be deflected vertically and for printed object 91 to come into contact, with a pressure, to build plate 80 or the top of a stack of previously transferred printed objects. The transfer device 76 of FIG. 8 may also comprise an adhesion modifier device 74 similar to the adhesion modifier device 74 of FIG. 7

Shape Modifier

Figure 9:
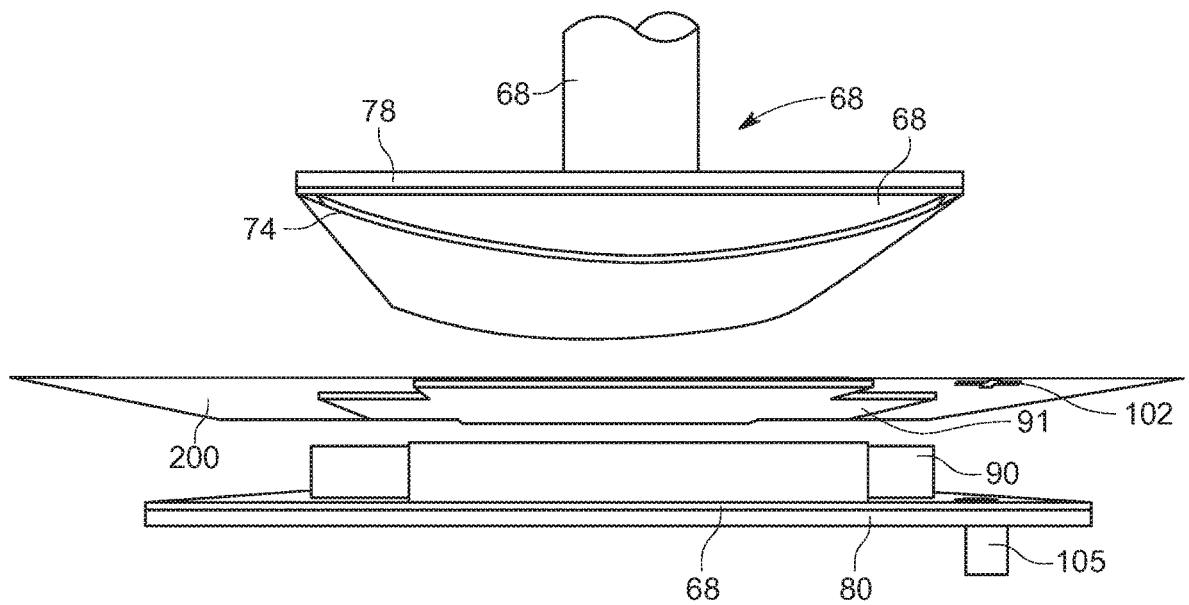
FIG. 9 is a schematic diagram illustrating a transfer module in accordance with one embodiment of the invention.

In another embodiment of the invention, as shown in FIG. 9, the transfer device 76 may be provided with a pressing device 82 and a shape modifier device 72. The transfer device 76 of FIG. 9 can also be provided with a single-axis carrier 78 which may provide vertical movement of pressing device 82. The vertical movement of pressing device 82 may cause carrier substrate 200 to be deflected vertically and for printed object 91 to come into contact, with a pressure, to build plate 80 or the top of a stack of previously transferred printed objects. Shape modifier 72 may comprise a pre-formed shaped structure which may be comprised of an elastic material that may be flattened by mechanical pressure applied normal to the shaped surface. As single axis carrier 78 brings printed object into contact with build plate 80 or the top of a stack of previously transferred printed objects 90, shape modifier 72 can progressively flatten and thus progressively bring printed object 91 into contact with build plate 80 or the top of a stack of previously transferred printed objects 90. The progressively moving contact between build plate 80 or the top of a stack of previously transferred printed objects 90 may assure a uniform attachment between printed object 91 and build plate 80 or the top of a stack of previously transferred printed objects 90. The transfer device 76 of FIG. 9 may also comprise an adhesion modifier device 74 similar to adhesion modifier device 74 of FIG. 7

Articulating Transfer Device

Figure 10:
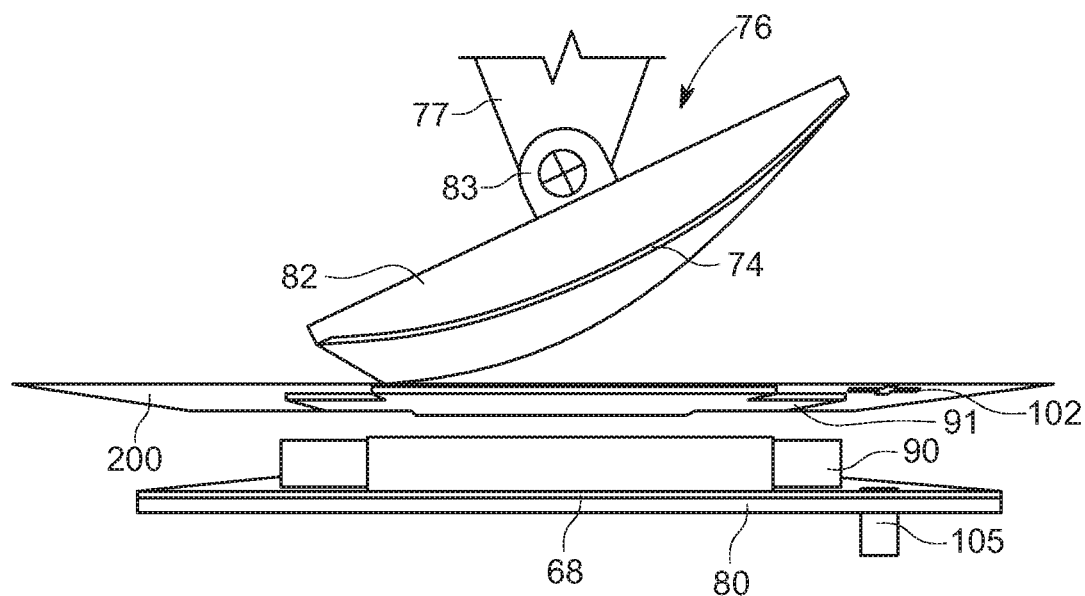
FIG. 10 is a schematic diagram illustrating a transfer module in accordance with one embodiment of the invention.

In yet another embodiment of the invention, as shown in FIG. 10, the transfer device 76 may be provided with a shaped pressing device 84 and an articulating device 83. Transfer device 76 of FIG. 10 can also be provided with a two-axis carrier 77 which may provide horizontal and vertical movement of shaped pressing device 84. Under the control of computer system 10, the vertical and horizontal movement of shaped pressing device 84 may cause carrier substrate 200 to be deflected vertically and for printed object 91 to come into contact, with a pressure, to build plate 80 or the top of a stack of previously transferred printed objects. Vertical movement of two-axis carrier may cause a predetermined end of shaped pressing device 84 to come into pressure contact with carrier substrate 200 such that a predetermined end of printed object 91 is in contact with build plate 80 or the top of a stack of previously transferred printed objects 90. Coordinating further vertical and horizontal movement of two-axis carrier 77 with articulating device 83 can cause the entire shaped surface of shaped pressing device 84 to progressively come into line contact, with pressure, to carrier substrate 200. The progressive line contact to carrier 200 may cause deflection of carrier substrate 200 to cause progressive line contact between printed object 91 and with build plate 80 or the top of a stack of previously transferred printed objects 90. The progressive line contact between printed object 91 and build plate 80 or the top of a stack of previously transferred printed objects 90 being sufficient to transfer printed object 91 to build plate 80 or the top of a stack of previously transferred printed objects 90. The transfer device 76 of FIG. 10 may also comprise an adhesion modifier device 74 similar to adhesion modifier device 74 of FIG. 7.

Assembly Apparatus

Assembly apparatus C, a portion of which is illustrated in FIG. 5, may comprise a X-Y positioner device 230 and a build station 110. Build station 110 may comprise a build plate 80. A Z axis positioner device 100 (vertical positioner) may be provided which may adjust the vertical position of build plate 80 to maintain the level of the top of previously transferred printed objects 90 at a predetermined vertical position to facilitate proper transfer of a printed object to build plate 80 or the top of a stack of previously transferred objects 90. The completed assembly of the patterned single-layer objects on the build plate is fused together under conditions suitable for the materials involved.

Adhesion Reducing Device

Build plate 80 may comprise adhesion reducing device 68 to facilitate removal of the completed stack of printed objects from the build plate 80. Adhesion reducing device 68 may be activated to reduce the adhesion of the stack of previously transferred objects 90 by an applied stimulus. The stimulus which may cause adhesion reducing layer 68 to release the stack of previously transferred objects 90, may be a thermal stimulus, a radiant stimulus, a magnetic stimulus a chemical stimulus or a mechanical stimulus.

Alignment System

Build plate 80 may further comprise an alignment sensor 105. Printed object 91 may comprise one or more alignment fiducials 102 which may interact with one or more alignment sensors 105 to precisely align printed object 91 with build plate 80 or with the top of a stack of previously transferred printed objects. Alignment sensor 105 may interact with alignment fiducial 102 in the UV spectrum, or in the visual spectrum or in the IR spectrum or magnetically, or mechanically. In conjunction with computer system 10, alignment sensors 105 may detect the position of alignment fiducials 102 to within 0.01 mm of actual position and cause build plate 80 to be positioned within 0.01 mm of a predetermined position relative to alignment fiducials 102.

Assembly Apparatus Positioner

Assembly apparatus C may comprise an X-Y positioner device 230 and a build station 110. Build station 110 may comprise a Z positioner device and build plate 80. Build station 110 may interact with build plate 80 and X-Y positioner device 230 to cause build plate 80, at the command of computer system 10, to be positioned to within 0.01 mm of a predetermined position relative to transfer area 240 of any one of the plurality of transfer modules comprising a multi-material multi-module printer system.

Figure 11:
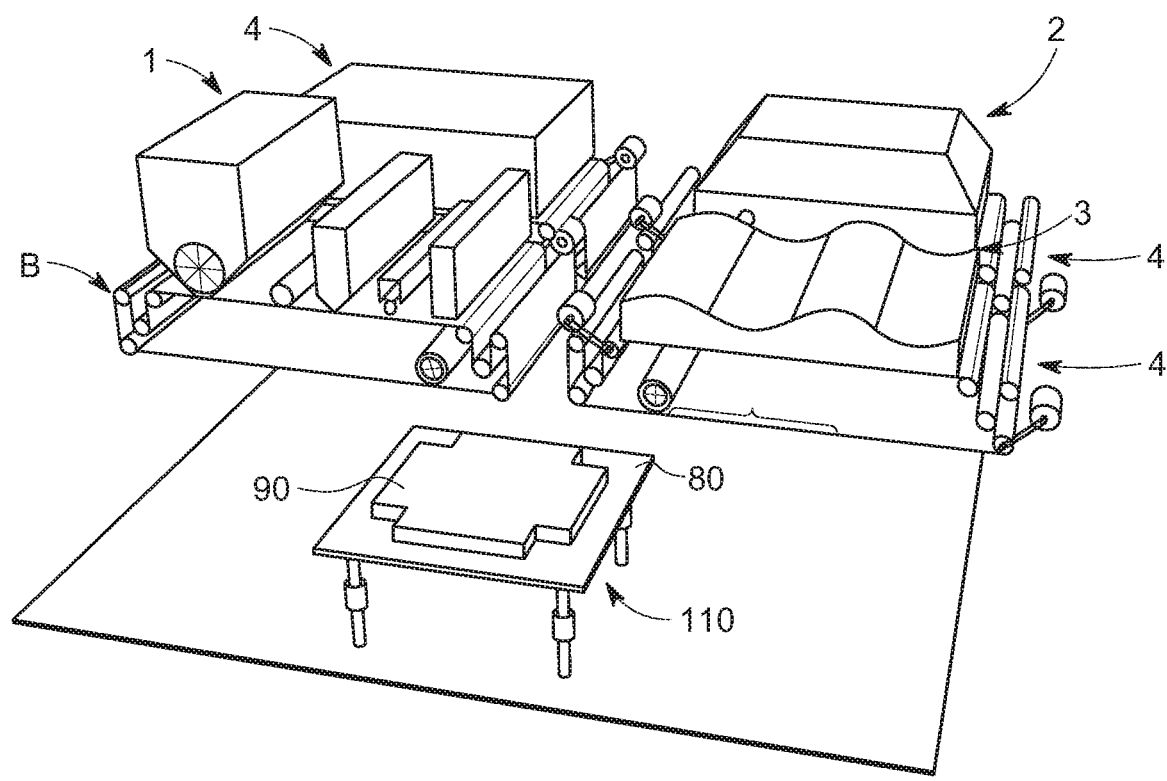
FIG. 11 is a schematic diagram illustrating one arrangement of a three-dimensional, additive manufacturing system in accordance with one embodiment of the invention.
Figure 12:
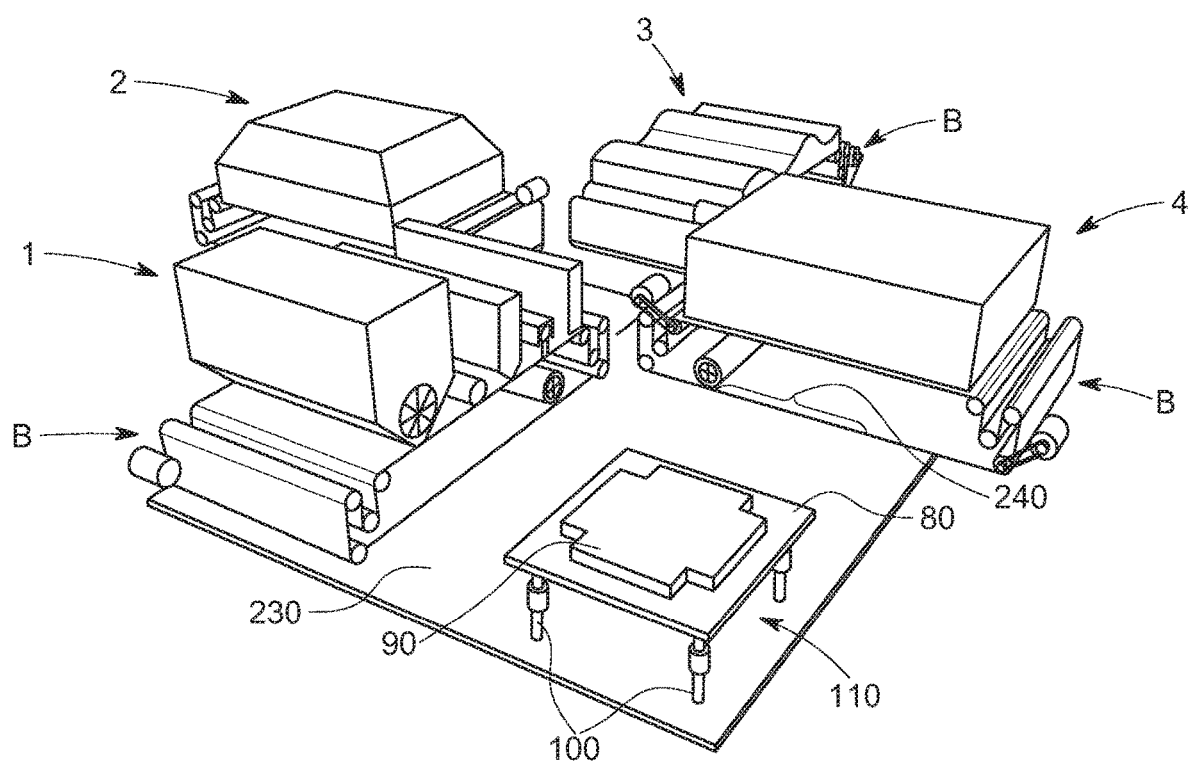
FIG. 12 is a schematic diagram illustrating another arrangement of a three-dimensional, additive manufacturing system in accordance with one embodiment of the invention.

X-Y positioner device 230 can comprise a computer-controlled X-Y movement system. The movement system may be but is not limited to an orthogonally connected pair of linear actuators or a planar linear motor. Build station 110 may be in communication with the X-Y movement system such that build station 110 may be moved to any point within the limits of the X-Y positioner device 230 as illustrated in FIG. 11 and FIG. 12. The X-Y movement system may be scaled such that build station 110 may be moved to, and accurately positioned to accept a printed layer transferred from transfer area 240 of any of the plurality device of transfer modules B associated with the printer. The X-Y positioner device 230 may further be scaled to allow build station 110 to move to an unload position, clear of all printer modules A, and transfer modules B associated with the printer. The clearance from modules A and B may be provided in the X-Y plane or by separation orthogonal to the X-Y plane. Build station 110 can further be provided with a rotational movement system to provide rotational alignment of build plate 80 with transfer area 240.

Hexapod

In another embodiment of the invention, precise location of build plate 80 may be provided by a hexapod that can provide movement along the X, Y and Z axis as well as rotation about at least one axis.

Assembly apparatus C may be the integrating component of the multi-material, multi-method 3D printer. Assembly apparatus C may be provided with a plurality of receiving devices which may accommodate the mounting of printer modules A and associated transfer modules B. Receiving devices of assembly apparatus C may comprise mechanical attachment devices to physically associate printer modules and transfer modules with an assembly apparatus C in a predetermined fashion. Receiving devices of assembly apparatus C may also be provided with logical attachment devices to integrate the printer module processing units with a central processing unit of FIG. 2 and FIG. 3.

FIG. 11 illustrates one embodiment of a multi-method 3D printer of the invention. FIG. 11 shows four printer modules A and four transfer modules B associated with assembly apparatus C. The four printer modules may all implement different patterning and deposition techniques. As shown in FIG. 11, a binder jetting module 1 is used for one of the four printer modules. Type two printer module 2, type three printer module 3, and type four printer module 4 may employ deposition and patterning techniques other than jetted binder. Printer modules 2, 3 and 4 may be chosen from printer modules employing deposition and patterning techniques such as, but not limited to electrophotography, off-set printing, jetted material printing and selective laser melting.

In FIG. 11, the four printer modules/transfer modules are aligned in two rows with their proximal ends toward the center of the X-Y positioner device 230. A build station printed part removal area clear of the printer modules in the horizontal plane is also illustrated.

It will be appreciated that the configuration shown in FIG. 11 is not limited to four printer modules A and could comprise as few as two printer modules, or three printer modules, or more than four printer modules. It is further understood that a printed part removal area may be provided by horizontal separation at any open space on X-Y positioner device 230 or may be provided by vertical separation of build station 110 from printer modules A and transfer modules B.

FIG. 12 represents an alternate configuration of a multi-method 3D printer in which the four printer modules align at 90 degrees to their closest neighbors, leaving a possible unload station in the space between printer modules or in a corner of X-Y positioner device 230. Other configurations will be obvious to those skilled in the art.

Plurality of Printer Modules

The multi-material multi-method 3D printer of the present invention is based on a plurality of printer modules A with associated transfer modules B, all integrated by an assembly apparatus C. Each printer module A may be capable of adjustment of operating parameters such as print thickness, binder concentration, binder type, and material type. While adjustment of operating parameters may significantly affect properties of the final printed object, each printer module creates printed objects based on one specific method. A non-exhaustive list of examples of potential methods includes jetted binder printing, electrophotographic printing, off-set printing, and jetted material printing. The preferred method to create a given printed object may be chosen based on the capabilities of the separate methods such as practical thickness range, minimum feature size, precision, and print rate. While most printing methods may be compatible with one or more material, the basic materials may require specific preparation for use with specific methods.

In practice, a multi-material multi-method 3D printer of the invention may be configured with one printer module A for each combination of printer method and materials required in the final manufactured parts. In a preferred embodiment of the present invention, at least one of the plurality of printer modules making up a multi-method 3D printer system may be quickly and easily replaced with another module, as required for a specific final part.

In one embodiment, at least one of the printer modules may be based on jetted binder technology for multi-material 3D printer applications.

As an example, consider a printer system that includes a first printer module and a second printer module. The first material (deposited by the first printer module) and the second material (deposited by the second printer module) need not be different. (1) Consider a case where jetted binder printer is used in the first printer module and an electrographic printer is used in the second printer module. A jetted binder printer can typically deposit material under deposition conditions including a deposition layer thickness in a range of 25 µm to 2,000 µm and an electrographic printer can typically deposit material under deposition conditions including a deposition layer thickness in a range of 3 µm to 75 µm. The deposition layer thicknesses associated with jetted binder printers and electrographic printers are different. Therefore, the printer system would be capable of assembling multiple single-layer objects having different thicknesses into a single three-dimensional object (printed part).

(2) A jetted binder printer can typically deposit material under deposition conditions including a voxel resolution in a range of 25 µm to 4,000 µm and an electrographic printer can typically deposit material under deposition conditions including a voxel resolution in a range of 3 µm to 150 µm. The voxel resolutions associated with jetted binder printers and electrographic printers are different. Therefore, the printer system would be capable of assembling multiple single-layer objects having different voxel resolutions into a single three-dimensional object (printed part).

As another example, consider a printer system that includes a first printer module and a second printer module. The first and second printer modules need not be different (both could be jetted binder printers). The printer modules are configured to deposit different materials. The first printer module forms first patterned single-layer objects characterized by a first material characteristic and the second printer module forms second patterned single-layer objects characterized by a second material characteristic. Consider a case where the first material is a ceramic precursor with negligible concentration of pore-forming agents, the concentration configured to create a ceramic with a porosity in a range of 0% to 10%, and second material is a ceramic precursor with a higher concentration of pore-forming agents, the concentration configured to create a ceramic with a porosity in a range of 25% to 75%. Accordingly, the printer system would be capable of assembling multiple single-layer objects having different porosities into a single three-dimensional object (printed part).

In one embodiment, the printer comprises a plurality of printer modules A that may each be associated with one of a plurality of transfer modules B, all of which may be coordinated with an assembly apparatus C. The plurality of printer modules may comprise printer modules employing at least two different deposition and patterning techniques and each one of the plurality of printer modules A may be configured to create printed objects of one material. Each printer module A may create printed objects with a different material, or some printer modules A may use the same material, or all of the printer modules of a 3D multi-method printer system may use the same material. Printer modules A, with associated transfer modules B, may be configured to be easily joined with or removed from assembly apparatus C, allowing for easy custom configuration of the printer to match the build requirements. A central computer system 10 (controller) may coordinate the operation of all the components of the printer.

Pattern Generation

The 3D printing system described above is used to create structures of two or more materials in complex three-dimensional patterns wherein the structure is built up in layers, each layer comprised of one or more materials. The pattern of each material in each layer may be generated in a manner similar to pattern generation for each layer of a conventional 3D printer. Specifically, the patterns for each layer may be derived from a slice of the whole structure through the use of CAD (computer aided design) software, such as, for example, SolidWorks. Unlike conventional 3D printers, in embodiments of the invention, the computer system 10 may separate the pattern of each layer into more than one material and into voxels that require different properties even as the material is the same as in other voxels. For instance, voxels requiring finer resolution and thus smaller voxel size may be sent to printer modules employing high resolution deposition and patterning technology even though the material is fundamentally the same.

Material Types

Material types may be chosen from at least two basic categories: robust materials and fugitive materials.

Robust materials are those that survive a post printing processing step to become the non-compressible voxels of the final printed part. The robust materials may survive a post processing step identical in composition and structure to the material as it was when printed. A robust material may also start as precursors of the final material. A post process may cause the precursors of a robust material to react to create a new chemical compound or to change phase or to change crystal types.

A fugitive material is one that can occupy voxels within a printed part that are designed to be occupied by a gas or a vacuum immediately after a post processing step. A fugitive material may be comprised of a solid or semi-solid material during the printing process, and during the process of assembling printed objects into a printed part. During a post processing step, a fugitive material is converted into a format that can easily escape from a printed part such as a gas or a liquid. The result of including a contiguous mass of voxels of fugitive material within a volume of robust material is a cavity of a predetermined configuration, after a post processing step. The cavity may be in communication with the outside of the printed part via a predesigned passage or may be completely sealed. A sealed cavity may be occupied by a predetermined gas or a vacuum.

Process

Figure 13:
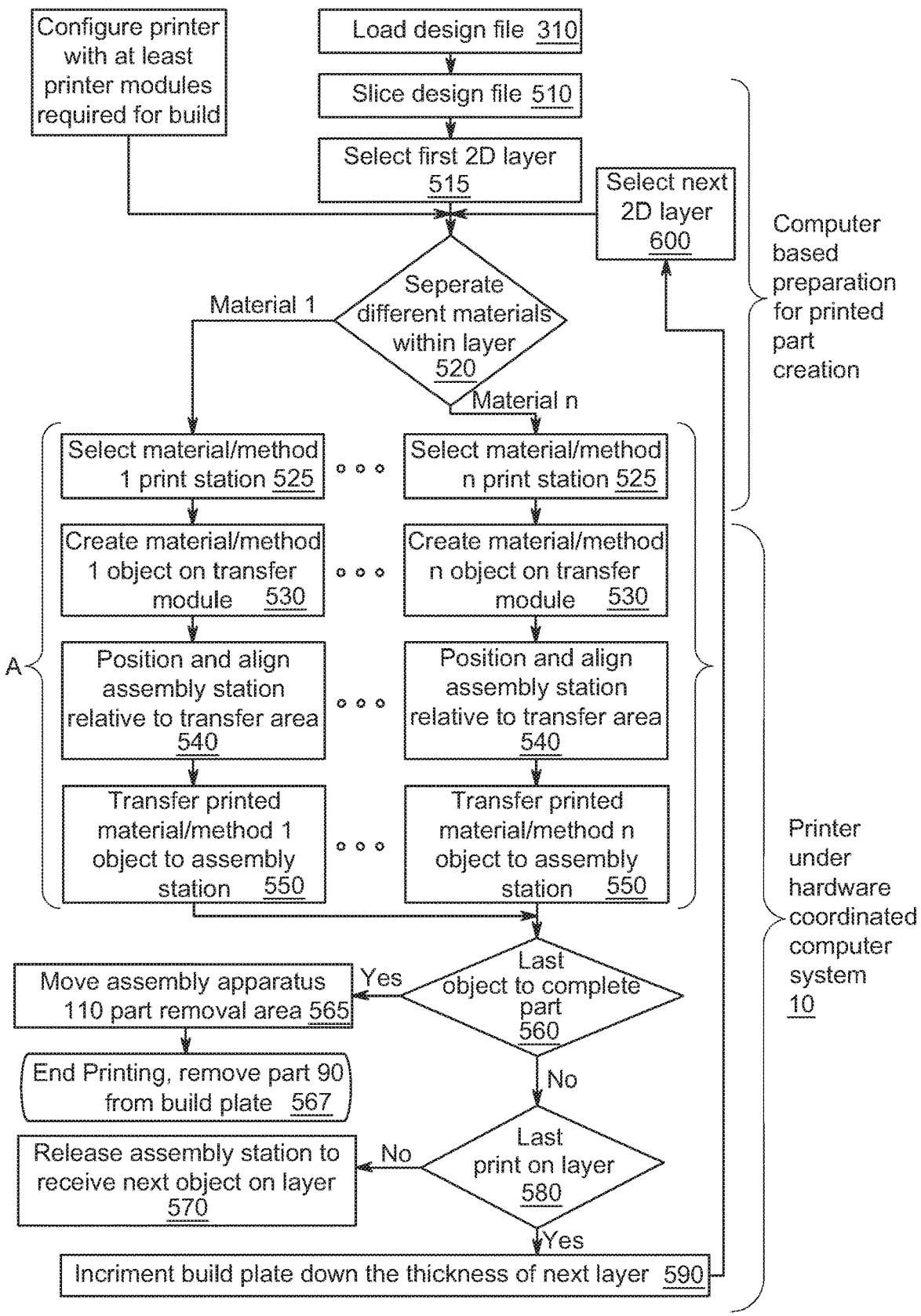
FIG. 13 is a flow diagram of a method of manufacturing a three-dimensional object in accordance with one embodiment of the invention.

The basic process for manufacturing a 3D printed part is illustrated in FIG. 13. As shown in FIG. 13, the process starts with a Design file 310 fully defining the structure, materials and specifications of the desired part. The design file may be sliced 510 into layers, the thickness of each layer determined by specifications for each position within the printed part, such as final thickness and pattern tolerance. Each layer may then be separated into regions that require different material and/or a different printing technique 520. Printer control instructions for each of the regions of different material/technique requirement may then be transferred to appropriate printer modules A of the printer system.

A central processing unit, such as the central processing unit shown in FIG. 2, has the capability to generate printer control files and forward them to appropriate printer control units for each printer module A. Central processing unit may also directly control an assembly apparatus C, including causing the positioning of build plate 80 of FIG. 5 such that printed objects 91 may be transferred from carrier substrate 200 in a predetermined sequence.

A build sequence starts by providing materials appropriate for each of the print modules A of the plurality of print modules A. Each different patterning and deposition technique may require material in different formats with respect, for example, to particle size, particle morphology, binder content and carrier vehicle. For printer modules based on powder bed and jetted binder technology, the feed stock material may be a fluidized material with particle sizes ranging between 0.0001 mm and 0.25 mm and exhibiting superior flow and self-packing properties.

With continued reference to FIG. 13, after the part to be printed is sliced into layers 510, the first 2D layer may be selected 515 and the layers separated into objects 520 print instruction may be sent to a jetted binder printer module loaded with the correct fluidized material 525 for the desired printed object, and the printed object created 530 in the transfer module. The printed object may then be aligned 540 with Build station 110. Printed object 91 may than be transferred 550 to build station 110. After each printed object on each printed layer 580 is aligned and transferred to build station 110, the build station may be moved to receive a printed object from another print station 1 of the multi-material multi-method printer system. When the last printed object of a printed layer is positioned on build station 110, build plate 80 of print station 110 may be incremented down 590 the thickness of the next layer, and the build instructions for the next printed layer selected and separated into different materials within the printed layer 520. The process may continue from step 520 through step 560 until the last printed object of the printed part 90 has been assembled on build station 110. When the last printed object 91 has been added to the printed part 90, build station 110 may be moved 565 to a part removal area, and released from build station 110.

Figure 14:
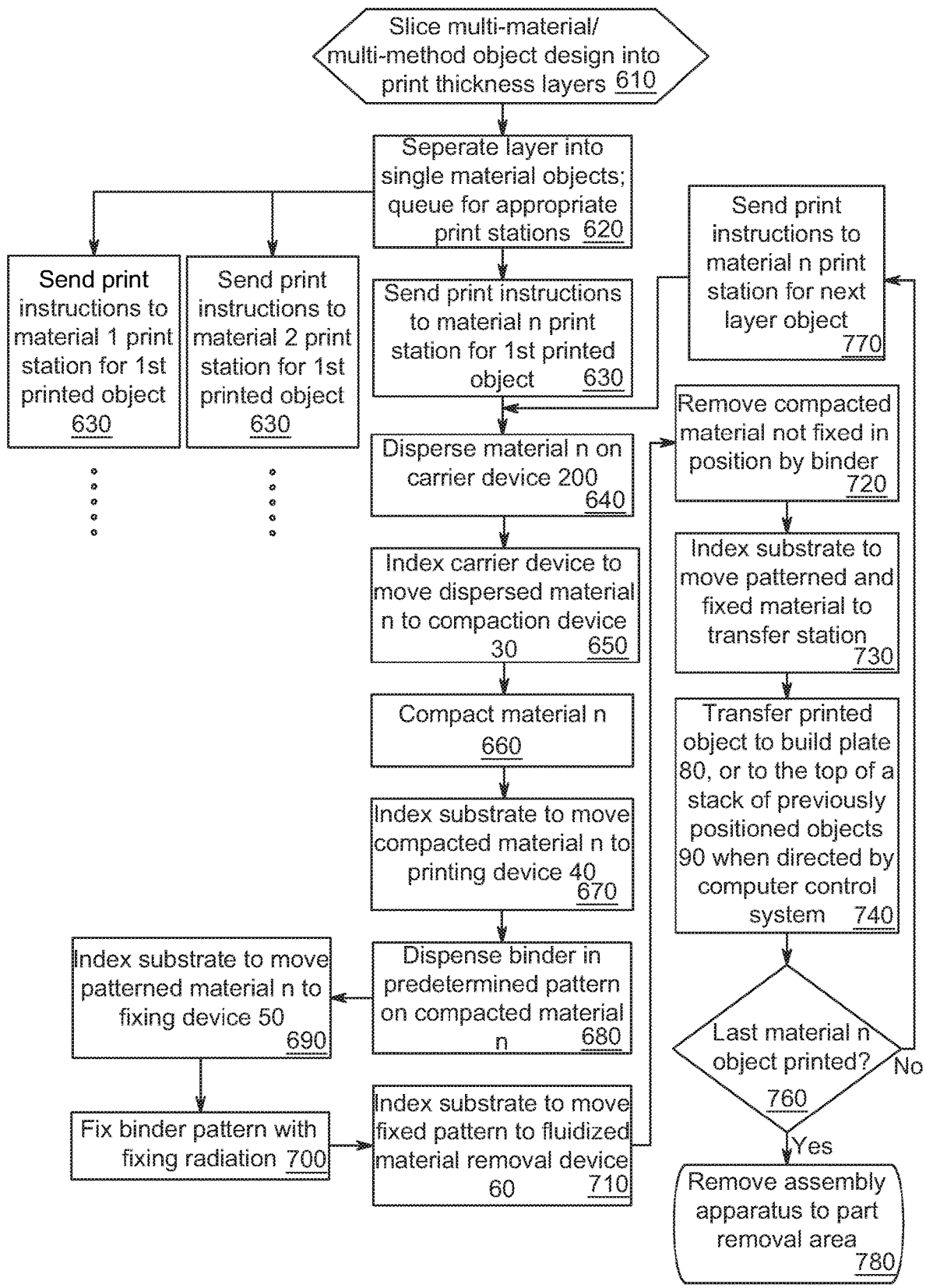
FIG. 14 is a flow diagram of a method of manufacturing patterned single-layer objects in a jetted binder printer module in accordance with one embodiment of the invention.

FIG. 14 illustrates a detailed process for the jetted binder printer module. After the part to be printed is sliced into layers 610 and the layers separated into objects 620 and queued to the proper print station, print instructions may be sent to a jetted binder printer module loaded with the correct fluidized material for the desired printed object. The creation of printed objects on each of the print stations A required to complete the selected printed layer with the deposition of fluidized material 640 from each involved print station on respective carrier device 200. Carrier devices 200 may then be indexed 650 to move the deposited fluidized materials to respective compactions devices 30. The fluidized materials may then be compacted 660 to a predetermined level by compaction devices 30.

Carrier device 200 may then be indexed 670 to printer device 40, and a predetermined pattern printed 680 thereon by printing device 40. The patterned fluidized materials may then be indexed 690 on carrier device 200 to material fixing device 50 and fixed 700 to make the printed pattern robust. The patterned and fixed flowable powder may than be indexed 710 on carrier device 200 to fluidized powder removal device 60, where fluidized powder which is not patterned and fixed may be removed 720 from carrier device 200, leaving only the predetermined printed objects. Carrier devices 200 are further indexed 730 on carrier device 200 to transfer station 240 to align the printed objects with build station 110.

The printed object may than be transferred 740 to build plate 80 or the tops of previously printed objects of printed part 90. If the printed object is not the last of the printed objects required for the printed part 760, the next printed layer is selected and print instructions sent 770 to the print stations required to complete the selected layer. Printing the remainder of the printed part continues through the loop from step 770 through step 760 until the last printed object is transferred to build station 110, where build station 110 is removed 780 to a part removal area.

Fluidized material appropriate for the target printed object may be dispersed on carrier substrate 200 by dispensing device 20. Dispensing device 20 may be located at a distal end of printer module A. Dispensing device 20 may comprise a material conditioning unit 24 which may condition a fluidized material in order to dispense a uniform layer of fluidized material in a precisely controlled layer of predetermined thickness.

Following a deposition of fluidized material, carrier substrate 200 may move the deposited fluidized material toward a proximal end of print module A to compaction device 30. Compaction device 30 may be activated to apply a stimulus to a layer of fluidized material to increase the packing density within a layer of fluidized material to at least 40% of the theoretical density of the material.

Following the compaction of a fluidized material, carrier substrate 200 may move toward a proximal end of printer module A, thus transporting a compacted fluidized layer into proximity of printer device 40. Printer device 40 may deposit a precisely measured volume of a binder material to every voxel of fluidized material that comprises the printed object undergoing creation. A binder material dispensed by printer device 40 may be chosen to securely bind particles of a fluidized material into a robust mass. Printer device 40 may be capable of depositing binder material of a predetermined volume to every voxel in a printed object. Voxel size in a jetted binder printed object may be as small as 0.010 mm.

Following deposition of binder material into the fluidized material of a printed object, carrier substrate 200 may be caused to move toward a proximal end of printer module A to a fixing device 50. Fixing device 50 may comprise a source of emissions capable of causing a binder material to bind together particles of fluidized material and fix them into a robust mass of a predetermined pattern and thickness. Emissions from fixing device 50 may be, but are not limited to thermal radiation, UV radiation, visible radiation, IR radiation, magnetic waves or particle beams.

With a printed object fixed together as a robust mass and affixed to carrier substrate 200, carrier substrate 200 may be caused to move to fluidized material removal device 60 of FIG. 6. Fluidized material removal device 60 may be provided with a disruptive device 61, an air knife device 62 and a vacuum port 64. Disruptive device 61 may mechanically disrupt fluidized material in the vicinity of a printed object which has not been fixed in place with binder material from fixing device 50. To further disrupted partially unfixed fluidized material 86, an air knife device may blow partially unfixed fluidized material away from fixed fluidized material 88 and carrier 200. Air knife device 61 may also aerosolize all unfixed fluidized material which may then be removed from enclosure through vacuum port 64 under the influence of an external vacuum source.

Movement of carrier substrate 200 from a distal end of printer module A may be controlled by coordinated action of proximal buffer device 212 and printing drive motor 250 of FIG. 5. Additional buffer devices may be provided between dispensing device 20 and proximal buffer device 212 to more conveniently coordinate a movement of a printed object between components of printer module A.

A printed object 91 free of unfixed fluidized material and partially disrupted fluidized material may be transported by carrier substrate 200 to transfer device 76. With computer system 10 coordinating actions of assembly apparatus C and transfer device 200, a printed object 91 may be transferred, with guidance of alignment sensor 105, to build plate 80, or the top of a stack of previously transferred printed objects 90. The alignment sensor aligns the fiducial marker to the build plate (assembly plate).

Transfer

Each of the plurality of printer modules A can create a printed object 91 as shown in FIGS. 7, 8, 9 and 10. A printed object may comprise all or a portion of a printed layer, and each printed object may be comprised of a single material and may have been created by a single patterning and deposition technology. After a printed object 91 is complete on carrier substrate 200 of a transfer module B, it may be moved to a transfer area 240, as shown for example in FIG. 5. Build station 110 may be caused to move by X-Y positioner device 230, under direction from computer system 10, to a predetermined location. Build plate 80 may be caused to move by Z positioner device 100 to a predetermined vertical location relative to carrier substrate 200. Final precise alignment of build plate 80 with printed object 91 affixed to carrier substrate 200 may be accomplished by coordination among alignment sensor 105 with reference to alignment fiducial 102, computer system 10, X-Y positioner device 230, and Z positioner device 100. The carrier substrate comprises a fiducial marker 102 for each of the patterned single-layer objects on the carrier substrate.

With precise alignment established between printed object 91 and build plate 80, transfer of a printed object may be accomplished as transfer device 76 causes printed object 91 to be moved into contact with build plate 80 or the top of a stack of previously transferred printed objects. To complete a transfer, transfer device 76 may apply a predetermined pressure to carrier substrate 200, and adhesion modifier device 74 can be activated by application of an appropriate stimulus. In a case where a printed layer is comprised of a plurality of printed objects 91, each one of the plurality or printed object 91 may be complementary to the other ones of the plurality of printed objects 91 such that all the voxels comprising a printed layer may be occupied with a voxel of a printed object 91.

As each printed object is transferred to previously transferred printed objects, activation of adhesion modifier device 74 can cause the adhesion between printed object 91 and carrier 200 to be reduced. Surfaces of the contacting printed object 91 and previously transferred printed objects 90 may be prepared to adhere to each other more strongly than printed object 91 adheres to carrier substrate 200. Preparation of the surfaces of printed object 91 and previously transferred printed objects may be accomplished by, but not limited to an engineered property of the surfaces of the materials comprising a printed object and a previously transferred printed object, or by an in situ surface treatment by a radiant source, or by an in situ treatment by a chemical source, or by an in situ treatment by a mechanical source, or by an in situ treatment by a magnetic source.

Printed Layer Creation

Figure 15:
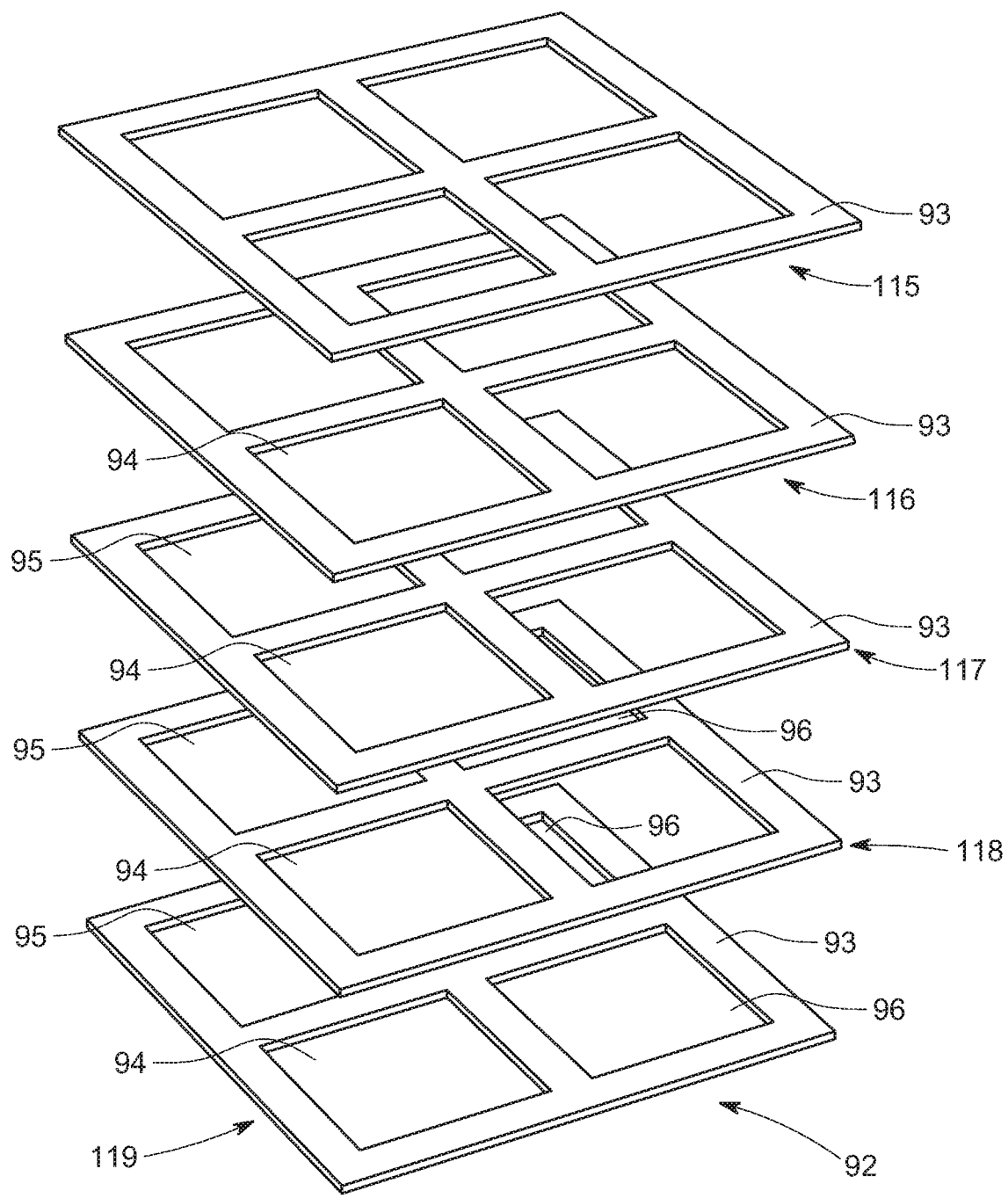
FIG. 15 is a schematic diagram illustrating the assembly of single-layer objects into a three-dimensional object in accordance with one embodiment of the invention.

The first layer of a printed part may be transferred as one or more printed objects 91 on an adhesion reducing device 68 which can be associated with a top surface of build plate 80. All subsequent layers may be transferred onto previously transferred printed objects 90 as one or more printed objects. FIG. 15 represents the possible steps of creation of a printed layer 92 by the sequential transfer of, for this example, five printed objects. The sequence progresses from top to bottom. During creation step 85, a printed object 93 may be transferred to a stack of previously transferred printed layers. Creation step 86 may be the transfer of printed object 94, comprised of a different material and/or created by a different technology form printed object 93, into an open area of creation step 85. Creation step 87 may continue as with creation step 86 by transferring printed object 95 into an open area of creation step 86. Creation step 88 may add printed object 96. Creation step 89 may complete printed layer 92 by transferring printed object 97. As each material in each layer is printed, it is stacked on previously printed objects in sequence to generate the desired structure in three dimensions and in two or more materials. While the example illustrates 5 different printed objects comprising the printed layer, it will be understood that a printed layer could comprise as few a one printed object or any number required to satisfy the design requirements.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A three-dimensional, additive manufacturing system, comprising:
    a first carrier substrate;
    a second carrier substrate;
    a first printer module configured to form a sequence of first patterned single-layer objects on the first carrier substrate;
    a second printer module configured to form a sequence of second patterned single-layer objects on the second carrier substrate;
    an assembly station comprising an assembly plate, the assembly plate being configured for assembly of the first patterned single-layer objects and the second patterned single-layer objects into a three-dimensional object;
    a first transfer module configured to transfer the first patterned single-layer objects from the first carrier substrate to the assembly station in a first transfer zone;
    a second transfer module configured to transfer the second patterned single-layer objects from the second carrier substrate to the assembly station in a second transfer zone; and
    a controller programmed to control:
        a sequence and patterns of the first patterned single-layer objects formed at the first printer module;
        a sequence and patterns of the second patterned single-layer objects formed at the second printer module; and
        a sequence of assembly of the first patterned single-layer objects and the second patterned single-layer objects into the three-dimensional object on the assembly plate;
    wherein:
        the first printer module is configured to deposit a first material under first deposition conditions;
        the second printer module is configured to deposit a second material under second deposition conditions; and
        at least one following condition is true:
            the second material is different from the first material; or
            the second deposition conditions are different from the first deposition conditions.

2. The three-dimensional, additive manufacturing system of claim 1, wherein the first printer module comprises a jetted binder printer.

3. The three-dimensional, additive manufacturing system of claim 2, wherein the second printer module comprises a jetted binder printer.

4. The three-dimensional, additive manufacturing system of claim 1, wherein the second printer module comprises an electrophotographic printer.

5. The three-dimensional, additive manufacturing system of claim 1, wherein:
    the second deposition conditions are different from the first deposition conditions;
    the first deposition conditions comprise a deposition layer thickness in a range of 25 µm to 2,000 µm; and
    the second deposition conditions comprise a deposition layer thickness in a range of 3 µm to 75 µm.

6. The three-dimensional, additive manufacturing system of claim 1, wherein:
    the second deposition conditions are different from the first deposition conditions;
    the first deposition conditions comprise a voxel resolution in a range of 25 µm to 4,000 µm; and
    the second deposition conditions comprise a voxel resolution in a range of 3 µm to 150 µm.

7. The three-dimensional, additive manufacturing system of claim 1, wherein:
    the second material is different from the first material;
    the first patterned single-layer objects have a first material characteristic; and
    the second patterned single-layer objects have a second material characteristic differing in values from the first material characteristic.

8. The three-dimensional, additive manufacturing system of claim 7, wherein one of the first material characteristic and the second material characteristic is a porosity in a range of 0% to 10%, and another of the first material characteristic and the second material characteristic is a porosity in a range of 25% to 75%.

9. The three-dimensional, additive manufacturing system of claim 1, further comprising:
a third printer module configured to form a sequence of third patterned single-layer objects on a third carrier substrate; and
a third transfer module configured to transfer the third patterned single-layer objects from the third carrier substrate to the assembly station in a third transfer zone;
wherein:
the assembly plate is configured for assembly of the first patterned single-layer objects, the second patterned single-layer objects, and the third patterned single-layer objects into the three-dimensional object; and
the controller additionally is programmed to control:
a sequence and patterns of the third patterned single-layer objects formed at the third printer module; and
a sequence of assembly of the first patterned single-layer objects, the second patterned single-layer objects, and the third patterned single-layer object into the three-dimensional object on the assembly plate.

10. The three-dimensional, additive manufacturing system of claim 1, wherein at least one of the first carrier substrate and the second carrier substrate is a belt.

11. The three-dimensional, additive manufacturing system of claim 1, wherein the assembly station additionally comprises a lateral positioner configured to laterally displace the assembly plate to a respective lateral position associated with the first transfer zone and the second transfer zone.

12. The three-dimensional, additive manufacturing system of claim 1, wherein the assembly station additionally comprises a vertical positioner configured to vertically displace the assembly plate.

13. The three-dimensional, additive manufacturing system of claim 1, wherein:
the first carrier substrate comprises a first fiducial marker for the first patterned single-layer objects;
the second carrier substrate comprises a second fiducial marker for the second patterned single-layer objects; and
the assembly station comprises an alignment sensor to align the first fiducial marker and the second fiducial marker to the assembly plate.

14. A method of manufacturing a three-dimensional object, comprising:
forming a sequence of first patterned single-layer objects on a first carrier substrate at a first printer module, according to a sequence and patterns instructed by a controller;
forming a sequence of second patterned single-layer objects on a second carrier substrate at a second printer module, according to a sequence and patterns instructed by the controller;
transferring the first patterned single-layer objects from the first carrier substrate to an assembly station in a first transfer zone;
transferring the second patterned single-layer objects from the second carrier substrate to the assembly station in a second transfer zone; and
assembling the first patterned single-layer objects and the second patterned single-layer objects into the three-dimensional object on an assembly plate of the assembly station, according to an assembly sequence instructed by the controller;
wherein the first printer module deposits a first material under first deposition conditions; and
wherein the second printer module deposits a second material under second deposition conditions, wherein at least one of the second material is from the first material and the second deposition conditions being different from the first deposition conditions.

15. The method of claim 14, wherein the first printer module comprises a jetted binder printer.

16. The method of claim 15, wherein the second printer module comprises a jetted binder printer.

17. The method of claim 14, wherein the second printer module comprises an electrophotographic printer.

18. The method of claim 14, wherein when the second deposition conditions are different from the first deposition conditions, the first deposition conditions comprise a deposition layer thickness in a range of 25 μm to 2,000 μm, and the second deposition conditions comprise a deposition layer thickness in a range of 3 μm to 75 μm.

19. The method of claim 14, wherein when the second deposition conditions are different from the first deposition conditions, the first deposition conditions comprise is a voxel resolution in a range of 25 μm to 4,000 μm, and the second deposition conditions comprise a voxel resolution in a range of 3 μm to 150 μm.

20. The method of claim 14, wherein when the second material is different from the first material, the first patterned single-layer objects are characterized by a first material characteristic, and the second patterned single-layer objects are characterized by a second material characteristic differing in values from the first material characteristic.

21. The method of claim 20, wherein one of the first material characteristic and the second material characteristic is a porosity in a range of 0% to 10%, and another of the first material characteristic and the second material characteristic is a porosity in a range of 25% to 75%.

22. The method of claim 14, wherein:
transferring the first patterned single-layer objects from the first carrier substrate to an assembly station in a first transfer zone comprises laterally displacing the assembly plate to a lateral position associated with the first transfer zone; and
transferring the second patterned single-layer objects from the second carrier substrate to the assembly station in a second transfer zone comprises laterally displacing the assembly plate to a lateral position associated with the second transfer zone.

23. The method of claim 14, wherein the assembly sequence comprises assembling at least one first patterned single-layer object and at least one second patterned single-layer object into a single layer of the three-dimensional object.

24. The three-dimensional, additive manufacturing system of claim 1, wherein the first carrier substrate, the second carrier substrate, the first printer module, the second printer module, the first transfer module, the second transfer module, and the controller are all integrated into a single body.

* * * * *